United States Patent
Moje et al.

(10) Patent No.: US 10,450,068 B2
(45) Date of Patent: Oct. 22, 2019

(54) AIRCRAFT LUGGAGE SYSTEM HAVING A LUGGAGE COMPARTMENT AND AN ADDITIONAL LUGGAGE COMPARTMENT

(71) Applicant: Airbus Operations GmbH, Hamburg (DE)

(72) Inventors: Sabrina Moje, Hamburg (DE); Matthias Breuer, Hamburg (DE); Paul Vine, Hamburg (DE); Uwe Schneider, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 274 days.

(21) Appl. No.: 15/177,937

(22) Filed: Jun. 9, 2016

(65) Prior Publication Data

US 2016/0288908 A1    Oct. 6, 2016

Related U.S. Application Data

(63) Continuation of application No. PCT/EP2014/077171, filed on Dec. 10, 2014.

(30) Foreign Application Priority Data

Dec. 11, 2013  (DE) .................. 10 2013 021 108

(51) Int. Cl.
    *B64D 11/00*  (2006.01)
(52) U.S. Cl.
    CPC .................. *B64D 11/003* (2013.01)
(58) Field of Classification Search
    CPC ....... B64D 11/003; B64D 11/00; B60R 5/003; B61D 37/003
    See application file for complete search history.

(56) References Cited

U.S. PATENT DOCUMENTS

| 4,678,226 A | 7/1987 | Ishizuka et al. |
| 5,035,471 A | 7/1991 | Ackerman |

(Continued)

FOREIGN PATENT DOCUMENTS

| DE | 19540929 | 5/1997 |
| DE | 102008006949 | 8/2009 |

(Continued)

OTHER PUBLICATIONS

International Search Report, dated Feb. 5, 2015, priority document.
German Search Report, dated Aug. 12, 2014, priority document.

*Primary Examiner* — Philip J Bonzell
(74) *Attorney, Agent, or Firm* — Greer, Burns & Crain, Ltd.

(57) ABSTRACT

An aircraft luggage system comprising a luggage compartment which comprises an upper side directed towards a ceiling of an aircraft when the luggage compartment is assembled in the aircraft, a lower side directed towards a floor of the aircraft, a rear side directed towards an outer contour of the aircraft, and two side faces connect the upper side to the lower side. The lower side of the luggage compartment is rigidly connected to the side faces and the rear side of the luggage compartment. A flap, movable between a closed position and an open position, is configured to make an inner space of the luggage compartment accessible or to close it. At least one additional luggage compartment is arranged adjacent to at least one of the upper side and the lower side of the luggage compartment.

21 Claims, 13 Drawing Sheets

(56) References Cited

U.S. PATENT DOCUMENTS

| | | | |
|---|---|---|---|
| 5,129,597 A * | 7/1992 | Manthey | B64D 11/003 244/118.5 |
| 5,687,929 A | 11/1997 | Hart et al. | |
| 5,820,076 A | 10/1998 | Schumacher et al. | |
| 6,290,175 B1 | 9/2001 | Hart et al. | |
| 7,665,692 B2 * | 2/2010 | Bock | B64D 11/003 105/325 |
| 8,672,266 B2 * | 3/2014 | Ehlers | B60R 5/003 244/118.5 |
| 9,522,735 B2 * | 12/2016 | Moje | B64D 11/003 |
| 9,650,143 B2 * | 5/2017 | Moje | B64D 11/003 |
| 2007/0164154 A1 * | 7/2007 | Bock | B64D 11/003 244/118.5 |
| 2009/0194635 A1 * | 8/2009 | Ehlers | B60R 5/003 244/118.5 |
| 2010/0044509 A1 | 2/2010 | Helfrich et al. | |
| 2011/0168701 A1 | 7/2011 | Conen et al. | |
| 2011/0278395 A1 | 11/2011 | Telgkamp et al. | |

FOREIGN PATENT DOCUMENTS

| | | |
|---|---|---|
| DE | 102008039637 | 3/2010 |
| DE | 102009029120 | 3/2011 |
| DE | 102010042970 | 11/2011 |
| EP | 0348130 | 12/1989 |
| EP | 0771728 | 9/2002 |
| FR | 1319048 | 2/1963 |

* cited by examiner

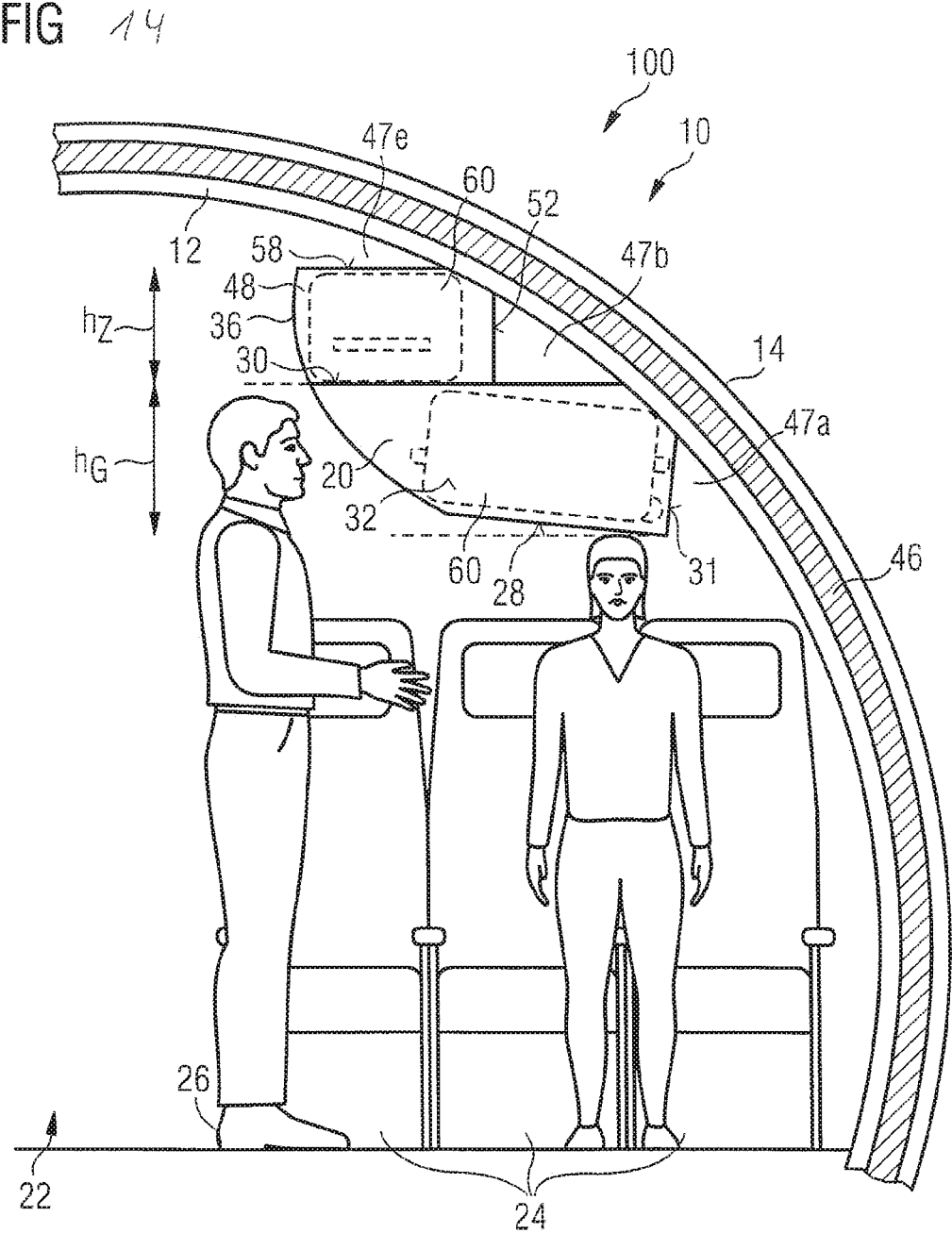

AIRCRAFT LUGGAGE SYSTEM HAVING A LUGGAGE COMPARTMENT AND AN ADDITIONAL LUGGAGE COMPARTMENT

CROSS-REFERENCES TO RELATED APPLICATIONS

This application is a continuation of International Application PCT/EP2014/077171 filed Dec. 10, 2014, designating the United States and published on Jun. 18, 2015 as WO 2015/086655. This application also claims the benefit of the German patent application No. 10 2013 021 108.5 filed on Dec. 11, 2013. The entire disclosures of the above are incorporated herein by way of reference.

BACKGROUND OF THE INVENTION

The invention relates to an aircraft luggage system having a luggage compartment and at least one additional luggage compartment. The invention further relates to an aircraft region which is formed in particular by a region of an aircraft cabin and which is provided with such an aircraft luggage system.

In a passenger cabin of a modern commercial aircraft, there are provided a large number of overhead luggage compartments which are installed along a longitudinal axis of the passenger cabin above rows of passenger seats. The storage space available in the overhead luggage compartments is limited, however, and is often insufficient to receive all the pieces of hand luggage which are brought by passengers into the passenger cabin. Therefore, EP 0 771 728 B1 or U.S. Pat. No. 5,820,076 proposes that a passenger cabin of a commercial aircraft be provided with luggage compartments which can be lowered from a closed transport position into an open loading position by means of guiding systems, that is to say, in the form of so-called "movable bins." Each luggage compartment is formed by at least two storage compartments which are arranged beside each other in the transverse direction of the cabin in a closed transport position of the luggage compartments in a ceiling region of the passenger cabin, base panels of the storage compartments forming at least a portion of a ceiling contour of the passenger cabin. In the lowered loading position, the storage compartments can be positioned above rows of seats one above the other with an access region which is directed towards a aisle.

SUMMARY OF THE INVENTION

An object of the invention is to provide a cost-effective aircraft luggage system which is simple to assemble, is not very maintenance-intensive and has a large storage space. Another object of the invention is to provide an aircraft region which is provided with such an aircraft luggage system.

An aircraft luggage system comprises a luggage compartment having an upper side which is directed towards a ceiling region of an aircraft region when the luggage compartment is assembled in the aircraft region. The luggage compartment further comprises a lower side which is arranged opposite, in particular, the upper side and which is directed towards a floor region of the aircraft region when the luggage compartment is assembled in the aircraft region. The luggage compartment further has a rear side which is directed towards an outer contour of the aircraft region when the luggage compartment is assembled in the aircraft region. The term "an outer contour of the aircraft region" is intended to be understood in this instance to be an outer delimitation of the aircraft region, that is to say, a delimitation which is directed away from an interior of the aircraft region and which may be defined, for example, by an aircraft outer skin which can be connected to a primary structure of the aircraft so as to transmit loads. Finally, the luggage compartment comprises two side faces which connect the upper side to the lower side. The lower side of the luggage compartment is rigidly connected to the side faces and the rear side of the luggage compartment.

A flap which is movable between a closed position and an open position is configured to make an inner space of the luggage compartment accessible or to close it. For example, the flap may be able to be pivoted between the closed position and the open position thereof about a pivot axis which extends along an edge of the upper side of the luggage compartment, which is directed towards the flap, relative to the upper side, the lower side, the side faces and the rear side of the luggage compartment. Consequently, the luggage compartment is a so-called "fixed bin," that is to say, a luggage compartment whose lower side is rigidly connected to the side faces and the rear wall and whose inner space is accessible simply by opening the movable flap. Such a luggage compartment is comparatively simple to produce and to assemble. Furthermore, a luggage compartment in the form of a "fixed bin" has only a small number of moving parts, that is to say, only the flap which can be moved between a closed position and an open position and is therefore comparatively not very maintenance-intensive.

Finally, the aircraft luggage system comprises at least one additional luggage compartment which is arranged adjacent to at least one of the upper side and the lower side of the luggage compartment. If desirable, the additional luggage compartment may be secured to the luggage compartment in the region of the upper side and/or the lower side of the luggage compartment. As a result of the additional luggage compartment, the aircraft luggage system provides more storage space than a conventional aircraft luggage compartment. The storage of pieces of hand luggage in the aircraft luggage system is thereby made easier so that the boarding and disembarking cycles for an aircraft provided with the aircraft luggage system can be reduced.

For example, a first additional luggage compartment which serves to receive small articles may be arranged adjacent to the lower side of the luggage compartment and, if desirable, may be fixed to the lower side of the luggage compartment. Additionally, or alternatively, a second additional luggage compartment which also serves to receive small articles may be arranged adjacent to the upper side of the luggage compartment and, if desirable, may be fixed to the upper side of the luggage compartment. The additional luggage compartment may then be used, for example, to accommodate articles of clothing, which prevents the articles of clothing from becoming squashed or even damaged by pieces of luggage which are stored in the luggage compartment, such as, for example, suitcases.

Furthermore, in particular, an additional luggage compartment which is arranged adjacent to the lower side of the luggage compartment may advantageously be connected to a grip rail or be formed integral with a grip rail which extends parallel to a longitudinal axis of the aircraft region when the additional luggage compartment is assembled in the aircraft region. However, the at least one additional luggage compartment may be constructed not only in the form of an additional storage space which is constructed to receive articles of small volume. Instead, it is also conceivable to provide the aircraft luggage system with an additional luggage compartment which has the same storage space as the luggage compartment or which provides even greater storage space than the luggage compartment.

The additional luggage compartment preferably comprises an upper side which is directed towards a ceiling region of the aircraft region when the additional luggage compartment is assembled in the aircraft region, a lower side which is directed towards a ceiling region of the aircraft region when the additional luggage compartment is assembled in the aircraft region, a rear side which is directed towards an outer contour of the aircraft region when the additional luggage compartment is assembled in the aircraft region and two side faces which connect the upper side to the lower side. The lower side of the additional luggage compartment is preferably rigidly connected to the side faces and the rear side of the additional luggage compartment. The additional luggage compartment is preferably therefore, similarly to the luggage compartment, constructed as a "fixed bin" which has only a few moving parts and which is comparatively simple to produce and assemble and which requires only a small amount of maintenance expenditure.

In an alternative embodiment, the additional luggage compartment may comprise a shell that is pivotable relative to the luggage compartment between a closed position and an open position about a pivot axis. In case the additional luggage compartment is arranged adjacent to the lower side of the luggage compartment, the shell of the additional luggage compartment may be lowered relative to the luggage compartment in order to open the additional luggage compartment so as to make its interior accessible. The access to the additional luggage compartment for a person standing in an aisle adjacent to the additional luggage compartment then is particularly comfortable.

The pivot axis about which the shell of the additional luggage compartment may be pivotable relative to the luggage compartment may extend substantially parallel to the longitudinal axis of the aircraft area. A front edge of the additional luggage compartment which faces, for example, an aisle of the aircraft area, then extends substantially parallel to a corresponding front edge of the luggage compartment. It is, however, also conceivable to design the additional luggage compartment such that its shell is pivotable relative to the luggage compartment about a pivot axis which extends substantially perpendicular to the longitudinal axis of the aircraft area. The additional luggage compartment then may be integrated in a PSU (Passenger Supply Unit) channel arranged above rows of passenger seats or may be positioned beside the PSU channel above the rows of passenger seats. The additional luggage compartment then is easily accessible to passengers sitting in the passenger seats and may, for example, be used to store small items such as sun glasses or the like.

An access opening of the additional luggage compartment may be covered by a mesh. The mesh prevents items received within the additional luggage compartment from falling out of the additional luggage compartment when the additional luggage compartment is opened, but still is transparent enough to allow a user to see the interior of the additional luggage compartment. As a result, items placed in the additional luggage compartment can easily be identified, which may help shorten disembarking cycles of the aircraft.

In particular, when the additional luggage compartment is arranged adjacent to the lower side of the luggage compartment, the upper side of the additional luggage compartment may be formed integral with the lower side of the luggage compartment. In a similar manner, particularly when the additional luggage compartment is arranged adjacent to the upper side of the luggage compartment, the lower side of the additional luggage compartment may be formed integral with the upper side of the luggage compartment. Finally, the side faces of the additional luggage compartment may be formed integral with the side faces of the luggage compartment. The aircraft luggage system can then be produced so as to be lightweight with only a small number of individual components and to be stable at the same time. Furthermore, the aircraft luggage system can be assembled in a particularly simple and time-saving manner because separate assembly of the additional luggage compartment can be dispensed with.

In principle, it is not absolutely necessary for the additional luggage compartment to be able to be closed by means of a flap or another suitable device. If desirable, however, the luggage compartment and the additional luggage compartment may have a common flap which is movable between a closed position and an open position. In such a configuration of the luggage compartment and the additional luggage compartment, only one flap has to be opened in order to make both the luggage compartment and the additional luggage compartment accessible. Furthermore, the number of moving components, which are therefore maintenance-intensive, is minimized.

Alternatively, however, it is also possible for the additional luggage compartment to comprise a separately constructed flap which is movable between a closed position and an open position. If a grip rail is intended to be connected to the additional luggage compartment or is intended to be formed integral therewith, the grip rail is preferably connected to the flap of the additional luggage compartment or is formed integral therewith. In a preferred embodiment, the flap of the luggage compartment and the flap of the additional luggage compartment are movable between the closed position and the open position thereof by being moved in opposite directions. For example, the flap of the luggage compartment may be pivotable into the open position thereof in the direction of a ceiling region of the aircraft region when the luggage compartment is assembled in the aircraft region, whereas the flap of the additional luggage compartment may be pivotable into the open position thereof in the direction of a floor region of the aircraft region when the additional luggage compartment is assembled in the aircraft region.

The flap of the luggage compartment, which is movable between a closed position and an open position, preferably has a convex or concave curvature when viewed from a position directed towards the aircraft luggage system when looking towards the flap of the luggage compartment. In a similar manner, the flap of the additional luggage compartment, which is movable between a closed position and an open position, if it is constructed separately from the flap of the luggage compartment, may have a convex or concave curvature, when viewed from a position directed towards the aircraft luggage system when looking towards the flap of the additional luggage compartment. In other words, when the aircraft luggage system is assembled in the aircraft region, the flap(s) may have a curvature directed counter to the curvature of the outer contour of the aircraft region or may be curved in the same direction as the outer contour of the aircraft region. The optical impression of a generous configuration of the space in the ceiling region of the aircraft region is produced by such a construction of the flap(s).

In a further embodiment, an access opening of the additional luggage compartment may be formed in the lower side of the luggage compartment that faces a floor region of the aircraft area. The additional luggage compartment then is accessible via an interior of the luggage compartment and may be used to receive components to be mounted in the overhead region of the aircraft region such as, for example, PSU components or system interfaces. The access opening preferably is covered by a detachable cover. The detachable cover protects components mounted within the additional luggage compartment from external influences, in particular influences occurring in use of the luggage compartment, but still allows easy access to the components, if needed, for example for maintenance purposes.

At least one of a maximum dimension of the luggage compartment between the side faces of the luggage compartment, a maximum dimension of the luggage compartment between the lower side and the upper side of the luggage compartment and a maximum dimension of the luggage compartment between the rear side and the movable flap of the luggage compartment is preferably selected in such a manner that a desired number of standard pieces of luggage can be received in a desired orientation in the luggage compartment. Alternatively, or additionally, at least one of a maximum dimension of the additional luggage compartment between the side faces of the additional luggage compartment, a maximum dimension of the additional luggage compartment between a lower side and an upper side of the additional luggage compartment and a maximum dimension of the additional luggage compartment between the rear side and the movable flap of the additional luggage compartment may be selected in such a manner that a desired number of standard pieces of luggage can be received in a desired orientation in the additional luggage compartment. For example, the dimensions of at least one of the luggage compartment and the additional luggage compartment may be selected in such a manner that one or two standard suitcases which are permitted on-board an aircraft as pieces of hand luggage may be accommodated in the luggage compartment so as to be on end or flat and positioned longitudinally or transversely.

An aircraft region is provided with an above-described aircraft luggage system.

In a preferred embodiment of the aircraft region, the luggage compartment is positioned in such a manner that the lower side of the luggage compartment is inclined relative to a floor of the aircraft region in the direction of the outer contour of the aircraft region at an angle of from 4 to 15°, preferably at an angle of from 4 to 10°, particularly preferably at an angle of from 6 to 8° and, in particular, preferably at an angle of approximately 7°. The upper side of the luggage compartment may be orientated parallel to the lower side, that is to say, also inclined in the direction of the outer contour of the aircraft region relative to a floor of the aircraft region, but may also be orientated parallel to the floor of the aircraft region. Additionally, or alternatively, the additional luggage compartment may also be positioned in such a manner that the lower side of the additional luggage compartment is inclined in the direction of the outer contour of the aircraft region at an angle of from 4 to 15°, preferably at an angle of from 4 to 10°, particularly preferably at an angle of from 6 to 8° and, in particular, preferably at an angle of approximately 7° relative to the floor of the aircraft region. The upper side of the additional luggage compartment may be orientated parallel to the lower side, that is to say, also inclined relative to the floor of the aircraft region in the direction of the outer contour of the aircraft region, but may also be orientated parallel to the floor of the aircraft region. Advantageously, at least the lower side of the luggage compartment or the additional luggage compartment, which extends directly above seat rows which are arranged in the aircraft region, that is to say, which forms the lower side of the aircraft luggage system, which is directed towards the seat rows, is inclined relative to the floor of the aircraft region as described above.

As a result of the inclined arrangement of at least the lower side of the aircraft luggage system, which is directed towards the seat rows, more head room is produced for passengers who are sitting in passenger seats arranged below the aircraft luggage system. If the luggage compartment and/or the additional luggage compartment is/are assembled so as to be generally inclined relative to the floor of the aircraft region, the luggage compartment and/or the additional luggage compartment can be moved closer to the outer contour of the aircraft region without impairing storage space, that is to say, the upper side of the luggage compartment and/or the additional luggage compartment can be moved nearer the outer contour of the aircraft region, whereby a generous impression of space is produced in particular in the ceiling region of the aircraft region. Furthermore, an inclination of the luggage compartment and/or of the additional luggage compartment relative to the floor of the aircraft region in the direction of the outer contour of the aircraft region can prevent pieces of luggage stored in the luggage compartment and/or the additional luggage compartment from falling out when the luggage compartment and/or the additional luggage compartment is/are opened.

The aircraft region may further comprise a first rib which forms a component of an aircraft primary structure and which extends in a curved manner along an outer contour of the aircraft region. At a distance from the first rib, there may be arranged parallel to the first rib a second rib which also forms a component of the aircraft primary structure and which extends in a curved manner along the outer contour of the aircraft region. The term "primary structure" is intended to be understood here to be the main carrying structure of an aircraft which defines the fuselage contour of the aircraft and which comprises as significant elements a plurality of ribs which are arranged substantially parallel to each other and a plurality of stringers which extend between the ribs substantially parallel to a longitudinal axis of the aircraft.

The luggage compartment may be arranged between the first and second rib in such a manner that a portion of a first side face of the luggage compartment, which is directed towards the first rib, is arranged opposite a side face of the first rib, which is directed towards the luggage compartment, and/or that a portion of a second side face of the luggage compartment, which is directed towards the second rib, is arranged opposite a side face of the second rib, which is directed towards the luggage compartment. Additionally or alternatively, the additional luggage compartment may be arranged between the first and second rib in such a manner that a portion of a first side face of the additional luggage compartment, which is directed towards the first rib, is arranged opposite a side face of the first rib, which is directed towards the additional luggage compartment, and/or that a portion of a second side face of the additional luggage compartment, which is directed towards the second rib, is arranged opposite a side face of the second rib, which is directed towards the additional luggage compartment. Consequently, the luggage compartment is positioned in the aircraft region in such a manner that it is no longer arranged at a distance from an inner face of the rib, which is directed towards the inner space of the aircraft region, but instead projects into the rib shadow of the rib. In a similar manner, the additional luggage compartment may also project into the rib shadow of the rib.

As a result of the positioning of the aircraft luggage system in such a manner that the luggage compartment and/or the additional luggage compartment project(s) into the rib shadow of the rib, the installation space present between the ribs may be used as an additional installation space for the luggage compartment and/or the additional luggage compartment. Therefore, the aircraft luggage system may, in comparison with conventional luggage systems, optionally have a greater depth in the direction of the outer contour of the aircraft region and may consequently receive more luggage or may be displaced further in the direction of the outer contour of the aircraft region. In the last case mentioned, the aircraft luggage system then no longer extends as far as a main aisle which extends along the longitudinal axis of the aircraft region but is instead comfortably accessible for persons who are standing between the rows of passenger seats to the side of the main aisle. It is thereby possible to prevent persons from having to stand in the main aisle of the aircraft region in order to load or unload the luggage compartment. Consequently, the boarding and disembarking cycles for an aircraft provided with the aircraft region can be further reduced.

However, it is also conceivable to arrange the aircraft luggage system in a conventional manner so that a rear side of the luggage compartment and/or the additional luggage compartment, when viewed in the direction of the outer contour of the aircraft region, is/are arranged upstream of the ribs of the aircraft primary structure, that is to say, therefore, the luggage compartment and/or the additional luggage compartment do not/does not project into the rib shadow of the rib.

In a preferred embodiment of the aircraft region, the portion of the first side face of the luggage compartment, which is arranged opposite the side face of the first rib directed towards the luggage compartment, extends substantially parallel to the side face of the first rib directed towards the luggage compartment. Additionally, or alternatively, the portion of the second side face of the luggage compartment, which is arranged opposite the side face of the second rib directed towards the luggage compartment, may extend substantially parallel to the side face of the second rib directed towards the luggage compartment. Similarly, the portion of the first side face of the additional luggage compartment, which is arranged opposite the side face of the first rib directed towards the additional luggage compartment, may extend substantially parallel to the side face of the first rib directed towards the additional luggage compartment. It is further conceivable for the portion of the second side face of the additional luggage compartment, which is arranged opposite the side face of the second rib directed towards the additional luggage compartment, to extend substantially parallel to the side face of the second rib directed towards the additional luggage compartment. The aircraft luggage system can then be assembled between the ribs in the aircraft region in a manner particularly saving installation space.

A portion of the first side face of the luggage compartment, which is directed towards the first rib, may project in the direction of the outer contour of the aircraft region beyond the side face of the first rib, which is directed towards the luggage compartment. Similarly, a portion of the second side face of the luggage compartment, which is directed towards the second rib, may project in the direction of the outer contour of the aircraft region beyond the side face of the second rib, which is directed towards the luggage compartment. Additionally, or alternatively, a portion of the first side face of the additional luggage compartment, which is directed towards the first rib, may project in the direction of the outer contour of the aircraft region beyond the side face of the first rib, which is directed towards the additional luggage compartment. Similarly, a portion of the second side face of the additional luggage compartment, which is directed towards the second rib, may project in the direction of the outer contour of the aircraft region beyond the side face of the second rib, which is directed towards the additional luggage compartment. The aircraft luggage system can then be installed between the ribs in a manner particularly saving installation space and, furthermore, is then particularly suitable for receiving angular standard pieces of luggage, such as, for example, standard suitcases, which are permitted on-board an aircraft as pieces of hand luggage.

The rear side of the luggage compartment, preferably, has a shape which is adapted to the outer contour of the aircraft region. For example, the rear side of the luggage compartment may have a curved shape which is adapted to the curved outer contour of the aircraft region. However, the rear side of the luggage compartment is preferably adapted to the outer contour of the aircraft region only partially in order to optimize the shape of the luggage compartment for receiving angular standard pieces of luggage. In a similar manner, the rear side of the additional luggage compartment may also have at least partially a shape which is adapted to the outer contour of the aircraft region.

In particular, the rear side of the luggage compartment may have a first and a second portion, the first portion preferably being able to extend substantially perpendicularly to a lower side of the luggage compartment, which is directed towards a floor region of the aircraft region. In the event that an upper side of the luggage compartment, which is directed towards a ceiling region of an aircraft region, extends substantially parallel to the lower side of the luggage compartment, the rear side of the luggage compartment preferably also extends substantially perpendicularly to the upper side of the luggage compartment. Furthermore, the second portion of the rear side of the luggage compartment may be inclined relative to a portion at an angle of from 120 to 160°, preferably at an angle of from 130 to 150°, particularly preferably at an angle of from 140 to 150°, in particular preferably at an angle of approximately 145°. The second portion of the rear side of the luggage compartment preferably adjoins portions of the side faces of the luggage compartment which project out of the rib shadow in the direction of the outer contour of the aircraft region. As a result of the inclined contour of the second portion of the luggage compartment rear side, the luggage compartment can be arranged particularly close to the outer contour of the aircraft region, that is to say, for example, the aircraft outer skin or an insulation element which extends at least partially along the outer contour of the aircraft region.

The first and second portion of the luggage compartment rear side may be connected to each other by a transition portion which is inclined relative to the first portion at an angle of from 140 to 170°, preferably at an angle of from 150 to 160° and particularly preferably at an angle of approximately 155°. Preferably, at least one of an edge which connects the second portion of the luggage compartment rear side to the upper side of the luggage compartment, an edge which connects the second portion of the luggage compartment rear side to the transition portion of the luggage compartment rear side, an edge which connects the transition portion of the luggage compartment rear side to the first portion of the luggage compartment rear side and an edge which connects the first portion of the luggage compartment rear side to the lower side of the luggage compartment is formed in a rounded manner in order to prevent damage to components, for example, insulation elements which are fitted in the region of the luggage compartment rear side in the aircraft region.

The rear side of the additional luggage compartment may be constructed as described above for the rear side of the luggage compartment.

In the aircraft region, the distance between the first and second rib may be selected in such a manner that a desired number of standard pieces of luggage can be received in a desired orientation in at least one of the luggage compartment and the additional luggage compartment.

The portion of the first side face of the luggage compartment, which is arranged opposite the side face of the first rib, may abut a first primary insulation element which at least partially surrounds the first rib. Similarly, the portion of the second side face of the luggage compartment, which is arranged opposite the side face of the second rib, may abut a second primary insulation element which at least partially surrounds the second rib. The installation space available between the ribs for the luggage compartment can then be used in a particularly efficient manner. Furthermore, the region between two luggage compartments which are mutually adjacent in the direction of the longitudinal axis of the aircraft region and whose dimensions are defined in the direction of the longitudinal axis of the aircraft region by the dimensions of the rib positioned between the luggage compartments and optionally a primary insulation element which at least partially surrounds the rib can be used as installation space for components to be fitted in the aircraft region. Those components may include, for example, electrical or electronic components, components of an aircraft air-conditioning system, such as, for example, air-guiding lines, electrical lines or water-guiding lines.

The rear side of the luggage compartment, in particular, the second portion of the rear side of the luggage compartment, may abut a third primary insulation element. The third primary insulation element may extend at least partially along the outer contour of the aircraft region, that is to say, for example, may have a curvature adapted to the outer skin of the aircraft, and may be fixed to a stringer which extends substantially parallel to the longitudinal axis of the aircraft region between the first and second rib. Conversely, at least one of the first portion of the luggage compartment rear side, the transition portion of the luggage compartment rear side and the luggage compartment upper side may be arranged at a distance from the third primary insulation element. The region between the first portion and the transition portion of the luggage compartment rear side and the third primary insulation element may then advantageously be used as installation space for components which are intended to be assembled in the aircraft region similarly to the region between the upper side of the luggage compartment and the third primary insulation element.

Similarly, the portion of the first side face of the additional luggage compartment, which is arranged opposite the side face of the first rib, may abut a first primary insulation element which at least partially surrounds the first rib. Similarly, the portion of the second side face of the additional luggage compartment, which is arranged opposite the side face of the second rib, may abut a second primary insulation element which at least partially surrounds the second rib. Finally, the rear side of the additional luggage compartment, in particular a second portion of the rear side of the additional luggage compartment, may also abut a third primary insulation element.

BRIEF DESCRIPTION OF THE DRAWINGS

Preferred embodiments of the invention will now be explained in greater detail with reference to the appended schematic drawings, in which:

FIG. 14 is a cross-section of an aircraft region formed by a portion of an aircraft passenger cabin perpendicularly to a floor of the aircraft region, which is provided with another alternative aircraft luggage system.

DETAILED DESCRIPTION OF THE PREFERRED EMBODIMENTS

Figure 1:
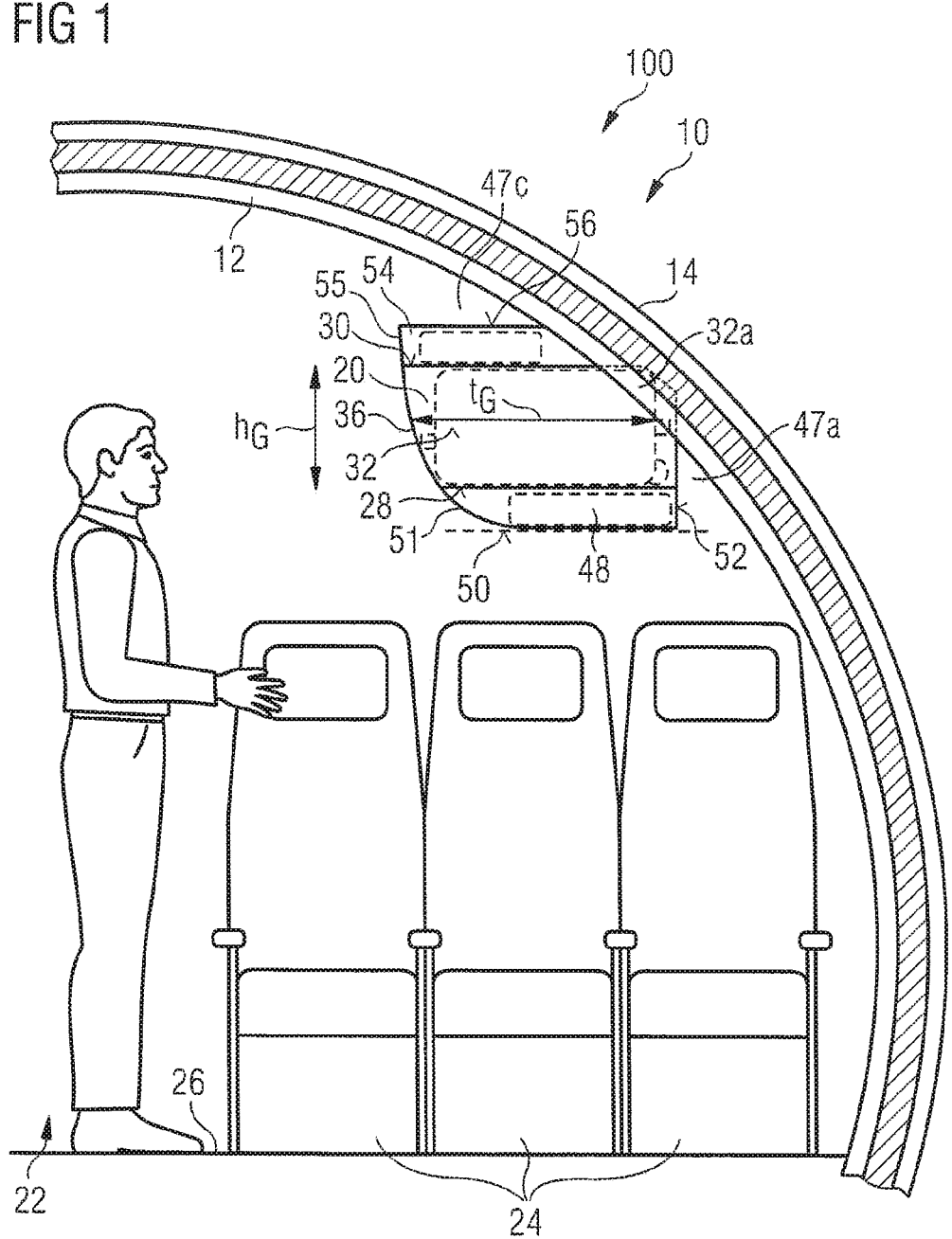
FIG. 1 is a cross-section of an aircraft region formed by a portion of an aircraft passenger cabin perpendicularly to a floor of the aircraft region, which is provided with an aircraft luggage system.
Figure 2:
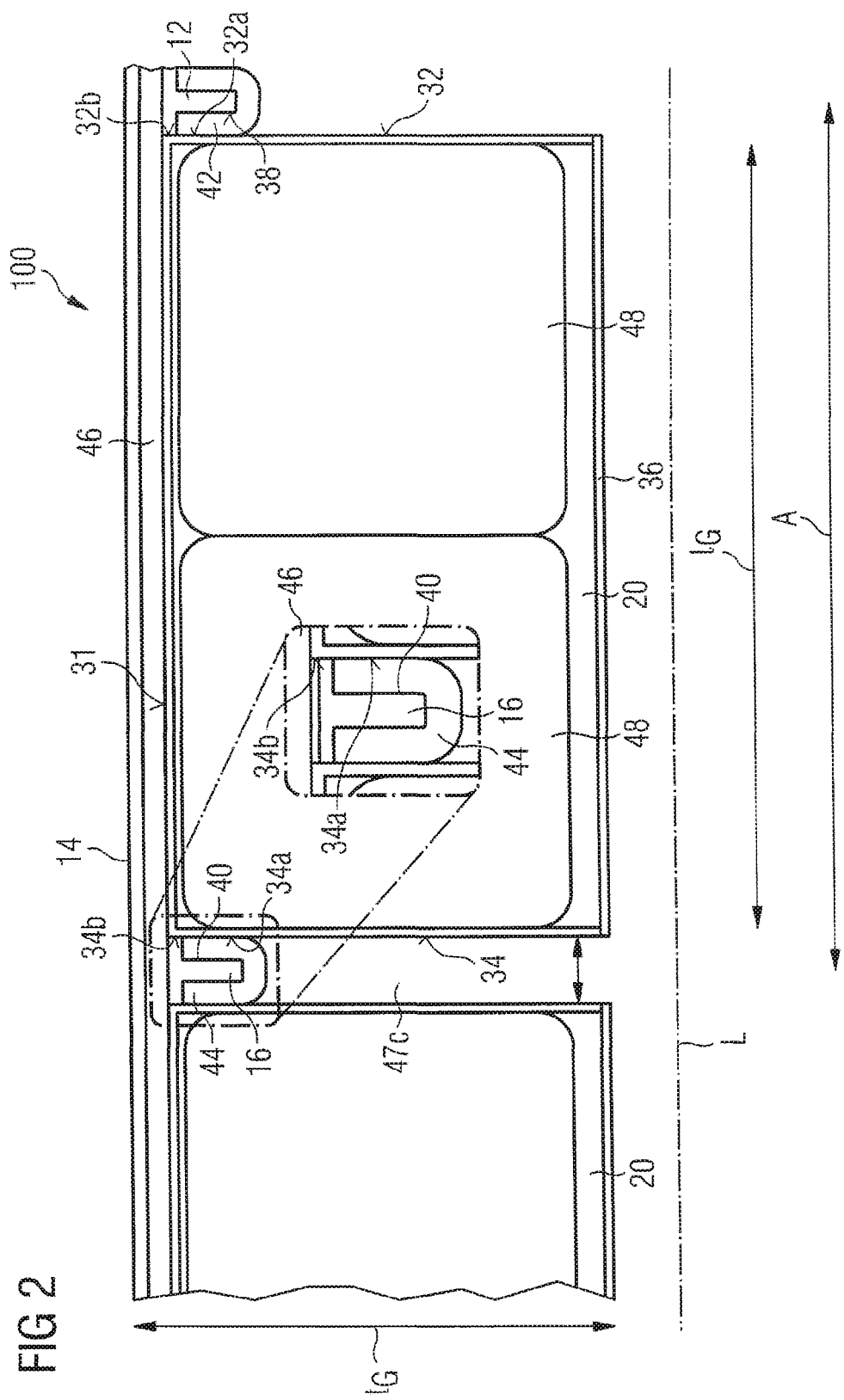
FIG. 2 is a detailed cross-section of the aircraft region according to FIG. 1 parallel to the floor of the aircraft region.

An aircraft luggage system 10 is installed in an aircraft region 100 illustrated in FIGS. 1 and 2. The aircraft region 100 comprises a first rib 12 which forms a component of an aircraft primary structure and which extends in a curved manner along an outer contour of the aircraft region 100, which is defined by an outer skin 14 of the aircraft. A second rib 16 is further provided in the aircraft region 100, see FIG. 2. The second rib 16 is arranged at a distance A from the first rib 12 and extends parallel to the first rib 12 in a curved manner along the outer contour of the aircraft region 100, which is defined by the outer skin 14. The second rib 16 also forms a component of the primary structure of the aircraft, which comprises additional ribs which are not shown in the Figures and a plurality of stringers 18 which extend between the ribs 12, 16 parallel to a longitudinal axis L of the aircraft region 100 and therefore also parallel to a longitudinal axis of the aircraft, see FIG. 3.

The aircraft luggage system 10 comprises a luggage compartment 20. The luggage compartment 20 is arranged above passenger seats 24 which are installed in the aircraft region 100 displaced in the direction of the outer contour of the aircraft region 100 from a main aisle 22 provided in the aircraft region 100. The luggage compartment 20 comprises a lower side 28 which is directed towards a floor region, that is to say, a floor 26 of the aircraft region 100, and an upper side 30 which is directed towards a ceiling region of the aircraft region 100. In the embodiment of an aircraft region 100 illustrated in the Figures, the lower side 28 and the upper side 30 of the luggage compartment 20 extend substantially parallel to each other. The luggage compartment 20 further comprises a rear side 31 which is directed towards the outer contour of the aircraft region 100, that is to say, the aircraft outer skin 14. Finally, the luggage compartment 20 comprises a first side face 32 which is directed towards the first rib 12 and a second side face 34 which is directed towards the second rib 16. The lower side 28 of the luggage compartment 20 is rigidly connected to the side faces 32, 34 and the rear side 31 of the luggage compartment 20.

Figure 3:
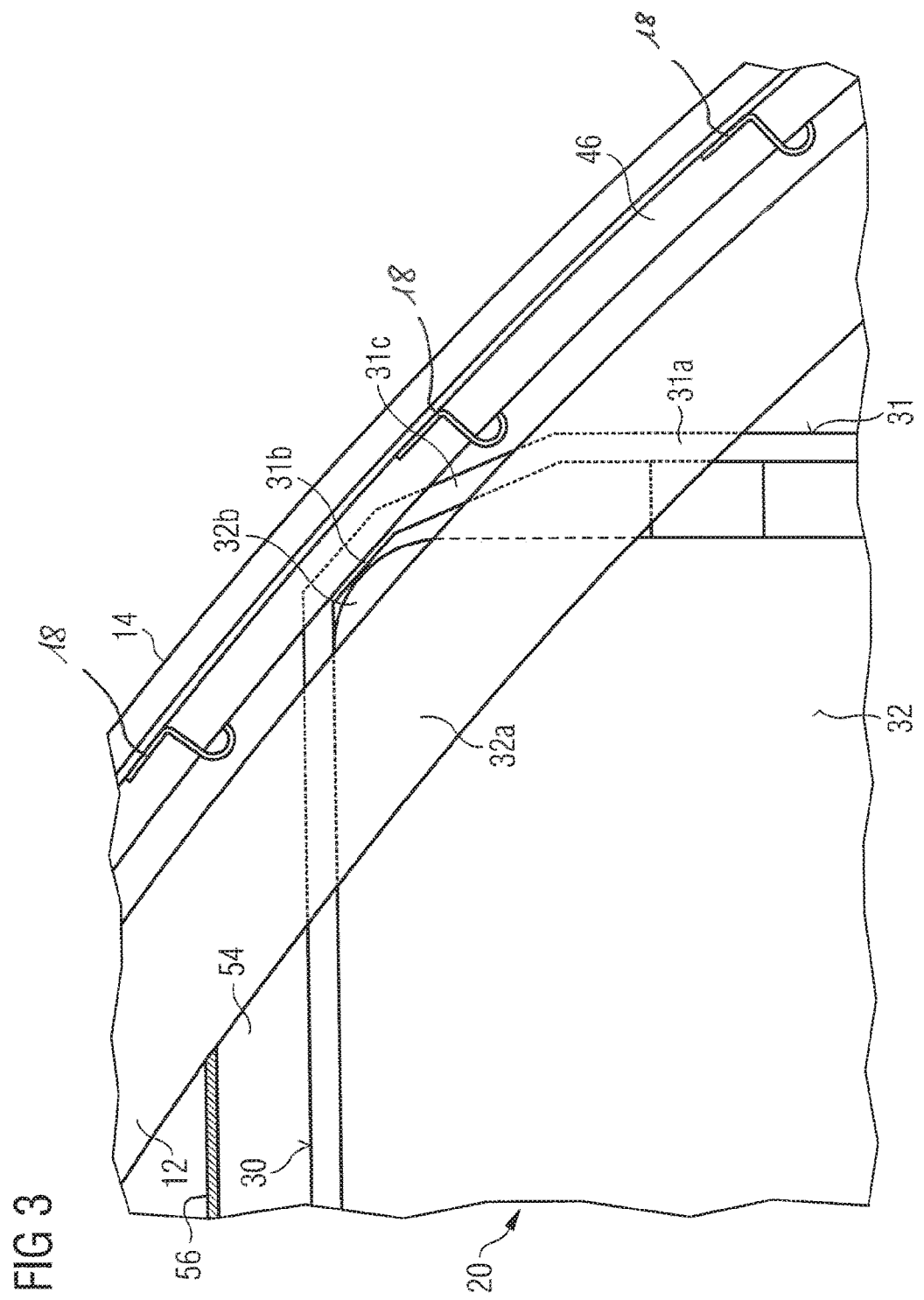
FIG. 3 is a detailed illustration of a luggage compartment which is fitted in the aircraft region according to FIG. 1.

The luggage compartment 20 is rigidly assembled in the aircraft region 100. For example, the luggage compartment 20 may be connected to the primary structure, in particular the ribs 12, 16, by means of suitable fixing elements. The luggage compartment 20 further has a flap 36 which can be moved between a closed position and an open position. FIGS. 1 to 3 show the flap 36 in the closed position thereof. However, it can be pivoted in the direction of the ceiling region of the aircraft region 100 relative to the lower side 28, the upper side 30 and the side faces 32, 34 of the luggage compartment 20 about a pivot axis which extends along an edge of the upper side 30 of the luggage compartment 20, which is directed towards the flap 36, in order to make the luggage compartment 20 accessible for loading with pieces of luggage and for unloading pieces of luggage from the luggage compartment 20. Consequently, the luggage compartment 20 is a so-called "fixed bin," that is to say, a luggage compartment 20 whose lower side 28 is rigidly connected to the side faces 32, 34 and the rear wall 31 and whose inner space is accessible simply by opening the movable flap 36.

As can best be seen in FIG. 2, the luggage compartment 20 is arranged between the first and second rib 12, 16 in such a manner that a portion 32a of the first side face 32 of the luggage compartment 20, which is directed towards the first rib 12, is arranged opposite a side face 38 of the first rib 12, which is directed towards the luggage compartment 20. Similarly, a portion 34a of the second side face 34 of the luggage compartment 20, which is directed towards the second rib 16, is arranged opposite a side face 40 of the second rib 16, which is directed towards the luggage compartment 20. In particular, the portion 32a of the first side face 32 of the luggage compartment 20, which is arranged opposite the side face 38 of the first rib 12 directed towards the luggage compartment 20, extends substantially parallel to the side face 38 of the first rib 12, which is directed towards the luggage compartment 20. Similarly, the portion 34a of the second side face 34 of the luggage compartment 20, which is arranged opposite the side face 40 of the second rib 16 directed towards the luggage compartment 20, extends substantially parallel to the side face 40 of the second rib 16, which is directed towards the luggage compartment 20.

Consequently, the region of the luggage compartment 20, which is delimited in the direction of the longitudinal axis L of the aircraft region 100 by the portions 32a, 34a of the side faces 32, 34 of the luggage compartment 20, is arranged in the rib shadow which is defined by the two ribs 12, 16. Consequently, the luggage compartment 20 may, in comparison with conventional luggage compartments, be arranged in a position which is further displaced in the direction of the outer contour of the aircraft region 100. The luggage compartment 20 is thereby also accessible to a person who is standing offset relative to the main aisle 22 in a region provided between the rows of passenger seats 20. Furthermore, the impression of a generous provision of space is given in the ceiling region of the aircraft region 100 and is further intensified, since the flap 36 of the luggage compartment 20 has a convex curvature when viewed from an interior of the aircraft region when looking towards the outer contour of the aircraft region 100.

As can be seen in particular in FIGS. 2 and 3, the luggage compartment 20 is even positioned so far in the direction of the outer contour of the aircraft region 100 that a portion 32b of the first side face 32 of the luggage compartment 20, which is directed towards the first rib 12, projects in the direction of the outer contour of the aircraft region 100 beyond the first side face 38 of the first rib 12, which is directed towards the luggage compartment 20. Similarly, a portion 34b of the second side face 34 of the luggage compartment 20, which is directed towards the second rib 16, projects in the direction of the outer contour of the aircraft region 100 beyond the first side face 40 of the second rib 16, which is directed towards the luggage compartment 20. The rear side 31 of the luggage compartment 20 has a shape which is adapted to the outer contour of the aircraft region 100. A region of the luggage compartment 20, which is delimited by the portions 32b, 34b of the side faces 32, 34 of the luggage compartment 20, is particularly suitable for receiving a corner of a parallelepipedal standard piece of luggage, for example, a standard suitcase which is permitted as hand luggage in an aircraft cabin.

As can be seen in FIG. 3, the rear side 31 of the luggage compartment 20 has a first portion 31a which extends substantially perpendicularly relative to the lower side 28 and the upper side 30 of the luggage compartment 20. A second portion 31b of the luggage compartment rear side 31 is inclined at an angle of approximately 145° relative to the first portion 31a. The first and second portion 31a, 31b of the luggage compartment rear side 31 are connected to each other by a transition portion 31c which is inclined relative to the first portion 31a at an angle of approximately 155°. This configuration of the luggage compartment rear side 31 allows the luggage compartment 20 to be moved particularly close to the outer contour of the aircraft region 100.

In order to optimally use the installation space available between the ribs 12, 16 for the luggage compartment 20, in the aircraft region 100, as illustrated in FIGS. 1 to 3, the portion 32a of the first side face 32 of the luggage compartment 20, which is arranged opposite the side face 28 of the first rib 12, abuts a first primary insulation element 42 which partially surrounds the first rib 12. In a similar manner, the portion 34a of the second side face 34 of the luggage compartment 20, which is arranged opposite the side face 40 of the second rib 16, abuts a second primary insulation element 44 which partially surrounds the second rib 16. Finally, it can be seen particularly from FIG. 3 that the second portion 31b of the rear side 31 of the luggage compartment 20 abuts a third primary insulation element 46 which extends along the outer contour of the aircraft region 100 in the region of an inner side of the aircraft outer skin 14, which is directed towards the inner space of the aircraft region 100. The third primary insulation element 46 may be fixed, for example, to the stringers 18 which extend between the ribs substantially parallel to the longitudinal axis L of the aircraft region 100.

In contrast, the first portion 31a of the luggage compartment rear side 31, the transition portion 31c of the luggage compartment rear side 31 and the luggage compartment upper side 30 are arranged at a distance from the third primary insulation element 46. A region 47a between the first portion 31a and the transition portion 31c of the luggage compartment rear side 31 and the third primary insulation element 46 can then advantageously be used as installation space for components which are intended to be assembled in the aircraft region 100, such as, for example, electrical or electronic components, components of an aircraft air-conditioning system, such as, for example, air-guiding lines, electrical lines or water-guiding lines, see FIG. 1.

Furthermore, a region 47b between two luggage compartments 20 which are adjacent to each other in the direction of the longitudinal axis L of the aircraft region 100 and whose dimensions are defined in the direction of the longitudinal axis L of the aircraft region 100 by the dimensions of the rib 16 which is positioned between the luggage compartments 20 and the primary insulation element 44 which partially surrounds the rib 16, can be used as installation space for components which are intended to be fitted in the aircraft region 100.

The aircraft luggage system 10 further comprises a first additional luggage compartment 48 which is arranged adjacent to the lower side 28 of the luggage compartment 20. The first additional luggage compartment 48 comprises an upper side, which is formed integral with the lower side 28 of the luggage compartment 20, and a lower side 50 which extends parallel to the upper side and which is directed towards the floor 26 of the aircraft region 100 and which forms a lower delimitation of the aircraft luggage system 10, which delimitation is directed towards the passenger seats 24. The first additional luggage compartment 48 further comprises a rear side 52 which is directed towards the outer contour of the aircraft region 100 and two side faces which connect the upper side and the lower side 50 to each other and which are formed integral with the side faces 32, 34 of the luggage compartment 20. A portion of the region 47a, which is directed towards the floor 26 of the aircraft region 100 and which acts as an installation space for components which are intended to be assembled in the aircraft region 100, is delimited by the rear side 52 of the first additional luggage compartment 48. The lower side 50 of the additional luggage compartment 48 is rigidly connected to the side faces and the rear side 52 of the additional luggage compartment 48 so that the additional luggage compartment 48 is also constructed as a "fixed bin" having only a small number of moving parts.

Finally, the first additional luggage compartment 48 comprises a flap 51 which can be pivoted between a closed position and an open position and which has convex curvature similarly to the flap 36 of the luggage compartment 20 when viewed from an inner space of the aircraft region 100. FIG. 1 also shows the flap 51 of the additional luggage compartment 48 in the closed position thereof. However, the flap 51 can be pivoted into the open position thereof about a pivot axis which extends along an edge of the lower side 50 of the additional luggage compartment 48 in the direction of the floor 26 of the aircraft region 100, which is directed towards the flap 51. The first additional luggage compartment 48 is an additional small-volume luggage compartment which can be used, for example, to accommodate small articles or attaché cases.

Finally, the aircraft luggage system 10 comprises a second additional luggage compartment 54 which is arranged adjacent to the upper side 30 of the luggage compartment 20. The second additional luggage compartment 54 comprises a lower side which is formed integral with the upper side 30 of the luggage compartment 20 and an upper side 56 which extends parallel to the lower side. The second additional luggage compartment 54 further comprises a rear side which is directed towards the outer contour of the aircraft region 100 and which at least partially abuts the third primary insulation element 46. Side faces which are formed integral with the side faces 32, 34 of the luggage compartment 20 connect the upper side 56 and the lower side of the second additional luggage compartment 54. A region 47c which is located between an upper side 56 of the second additional luggage compartment 54 and the outer contour of the aircraft region 100 is available as installation space for components which are intended to be fitted in the aircraft region 100.

Finally, the second additional luggage compartment 54 comprises a flap which can be pivoted between a closed position and an open position and which is formed integral with the flap 36 of the luggage compartment 20. By the flap 36 being pivoted, the luggage compartment 20 and the second additional luggage compartment 54 can then be opened or closed simultaneously. The second additional luggage compartment 54 is, similarly to in the first additional luggage compartment 48, a small-volume additional luggage compartment which can be used, for example, to accommodate small articles or attaché cases.

Figure 4:
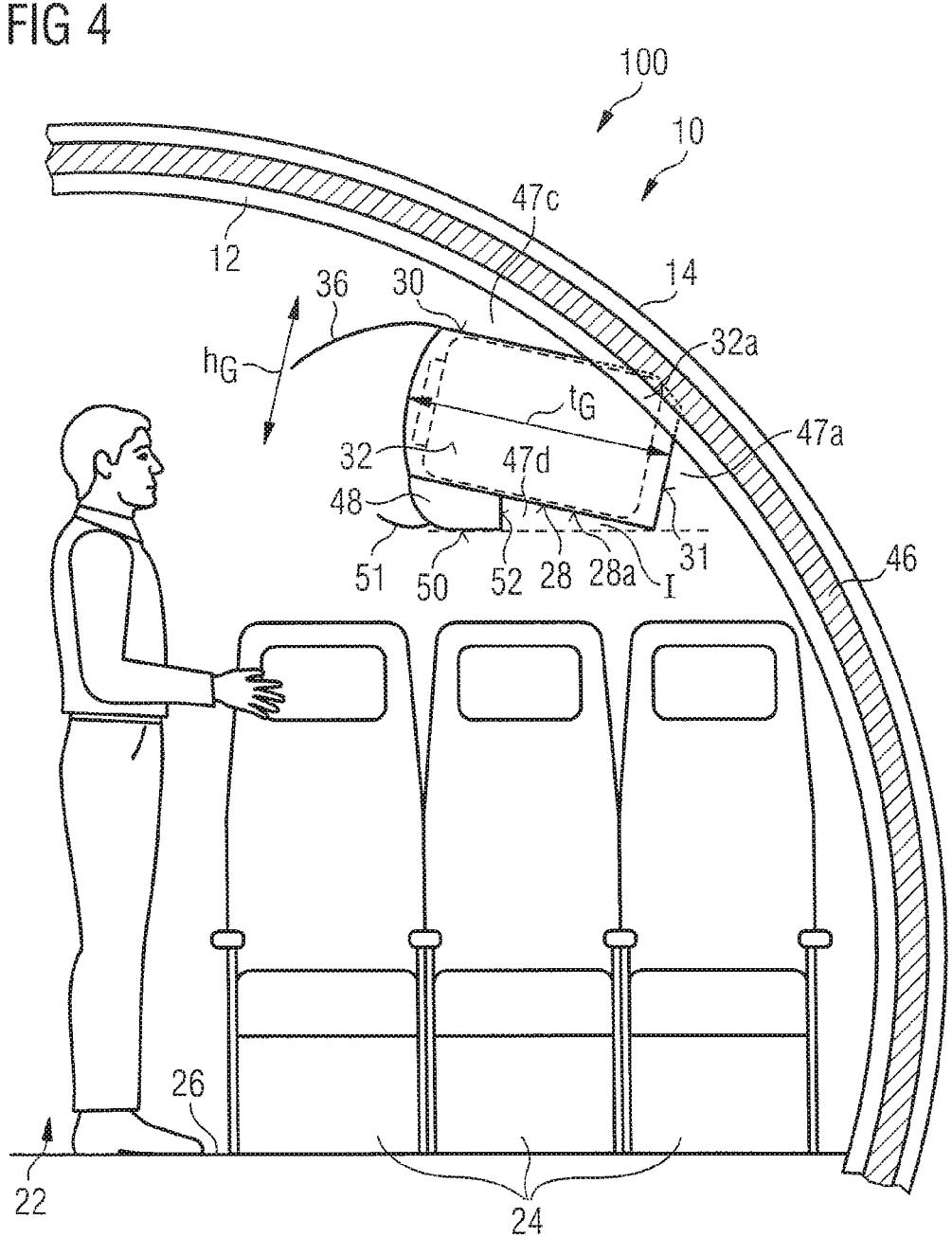
FIG. 4 is a cross-section of an aircraft region formed by a portion of an aircraft passenger cabin perpendicularly to a floor of the aircraft region, which is provided with an alternative aircraft luggage system.

The embodiment of an aircraft region 100 as shown in FIG. 4 differs from the arrangement according to FIGS. 1 to 3 in that the aircraft luggage system 10 is positioned in such a manner that the lower side 28 and the upper side 30 of the luggage compartment 20 are inclined at an angle of approximately 7° relative to the floor 26 of the aircraft region 100 in the direction of the outer contour of the aircraft region 100. This arrangement of the luggage compartment 20 prevents pieces of luggage arranged in the luggage compartment 20 from falling out when the luggage compartment 20 is opened. Furthermore, as a result of the inclined arrangement of the luggage compartment 20, the head room for passengers sitting in the passenger seats 24 is increased and the optical impression of a generously constructed ceiling region in the aircraft region 100 is increased.

The aircraft luggage system 10 further has only a first additional luggage compartment 48 which is arranged adjacent to the lower side 28 of the luggage compartment 20. The installation space 47c available for assembly for components which are intended to be assembled in the aircraft region 100 is therefore delimited by the upper side 30 of the luggage compartment 20 and the outer contour of the aircraft region 100. Again, the first additional luggage compartment 48 is a small-volume additional luggage compartment which can be used, for example, to accommodate small articles. Alternatively, it is conceivable to use the first additional luggage compartment 48 not for the purposes of storing luggage but instead to assemble components which are intended to be assembled in the region of the lower side 28 of the luggage compartment 20, for example, PSU (Passenger Supply Unit) components in the first additional luggage compartment 48. Furthermore, a grip rail which extends along the longitudinal axis L of the aircraft region 100 may be formed integral with the first additional luggage compartment 48, in particular a flap 51 of the first additional luggage compartment 48, which can be pivoted between a closed position and an open position.

FIG. 4 shows both the flap 36 of the luggage compartment 20 and the flap 51 of the first additional luggage compartment 48 in the open position thereof. This illustration shows that the flap 36 of the luggage compartment 20 can be pivoted into the open position thereof in the direction of the ceiling region of the aircraft region 100, whereas the flap 51 of the first additional luggage compartment 48 can be pivoted into the open position thereof in the direction of the floor region of the aircraft region 100.

In addition to the regions 47a, 47b, 47c, in the aircraft luggage system 10 according to FIG. 4, a region 47d, which is delimited by a rear side 52 of the first additional luggage compartment 48, which is directed towards the outer contour of the aircraft region 100, a portion 28a of the luggage compartment lower side 28 and a notional line I which is parallel to the floor 26 of the aircraft region 100, can be used as additional installation space for components which are intended to be assembled in the aircraft region 100. Those components may be, for example, PSU components. The structure of the aircraft luggage system 10 according to FIG. 4 further corresponds to the structure of the arrangement according to FIGS. 1 to 3.

Figure 5:
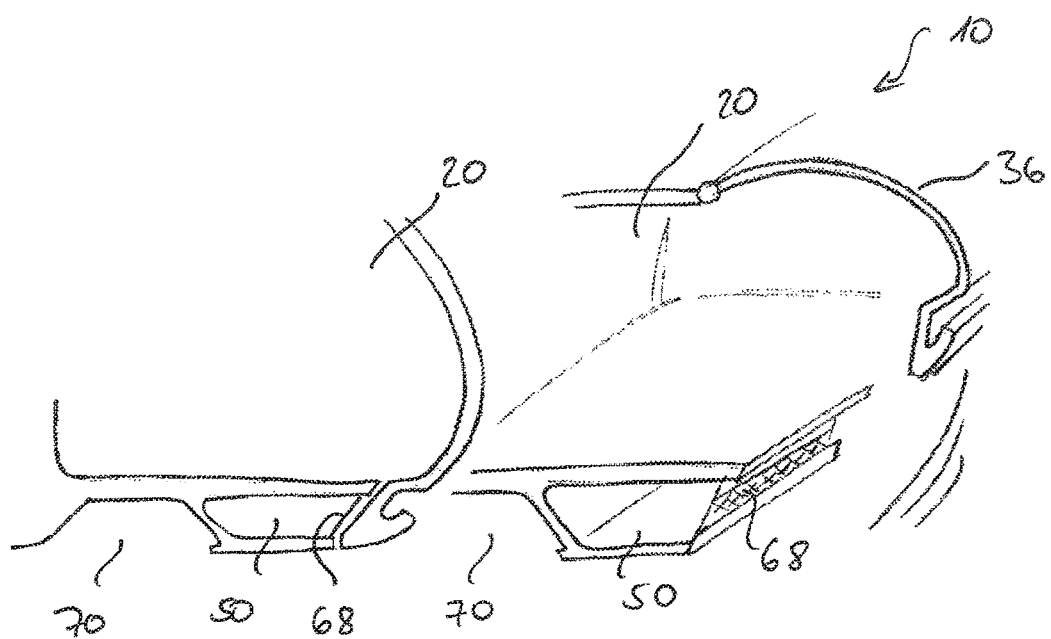
FIG. 5 is an alternative aircraft luggage system suitable for installation in the aircraft region of FIG. 4.

FIG. 5 illustrates an alternative aircraft luggage system 10 suitable for installation in the aircraft area 100 according to FIG. 4. The aircraft luggage system 10 shown in FIG. 5 differs from the arrangement of FIG. 4 in that the luggage compartment 20 and the first additional luggage compartment 50 have a common hinged flap 36 that is pivotal between a closed position and an open position so that the luggage compartment 20 and the first additional luggage compartment 50 may be closed and opened at the same time by pivoting the hinged flap 36. An access opening 66 of the additional luggage compartment 50 is covered by a mesh 68. The mesh 68 prevents items received within the additional luggage compartment 50 from falling out of the additional luggage compartment 50 when the luggage compartment 20 and the additional luggage compartment 50 are opened, but still is transparent enough to allow a user seeing the interior of the additional luggage compartment 50 and identifying items stored therein. Otherwise, the structure of the aircraft luggage system 10 according to FIG. 5 corresponds to the structure of the arrangement shown in FIG. 4.

Figure 6:
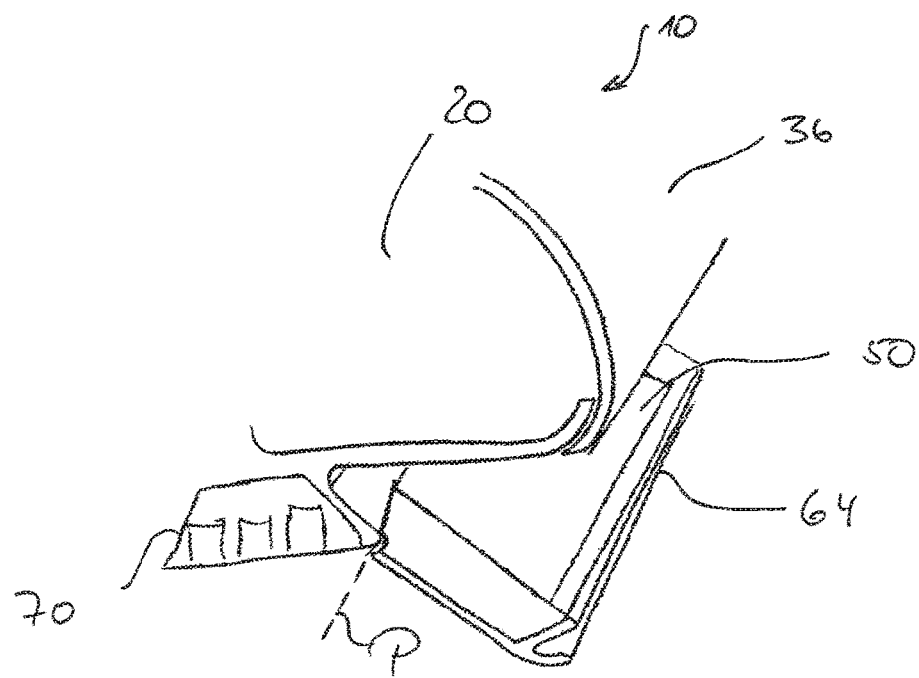
FIG. 6 is a further alternative aircraft luggage system suitable for installation in the aircraft region of FIG. 4.

FIG. 6 illustrates a further alternative aircraft luggage system 10 suitable for installation in the aircraft area 100 according to FIG. 4. The aircraft luggage system 10 shown in FIG. 6 differs from the arrangement of FIG. 4 in that the additional luggage compartment 50 comprises a shell 64 that is pivotable relative to the luggage compartment 20 between a closed position and an open position about a pivot axis P. Since the additional luggage compartment 50 is arranged adjacent to the lower side 28 of the luggage compartment 20, the shell 64 of the additional luggage compartment 50 may be lowered relative to the luggage compartment 20 in order to open the additional luggage compartment 50. In the luggage compartment arrangement according to FIG. 6, the pivot axis P about which the shell 64 of the additional luggage compartment 50 is pivotable relative to the luggage compartment 20 extends substantially parallel to the longitudinal axis L of the aircraft area 100. The additional luggage compartment 50 thus is easily accessible for a person standing in an aisle of the aircraft area 100 adjacent to the additional luggage compartment 50. Otherwise, the structure of the aircraft luggage system 10 according to FIG. 6 corresponds to the structure of the arrangement shown in FIG. 4.

Figure 7:
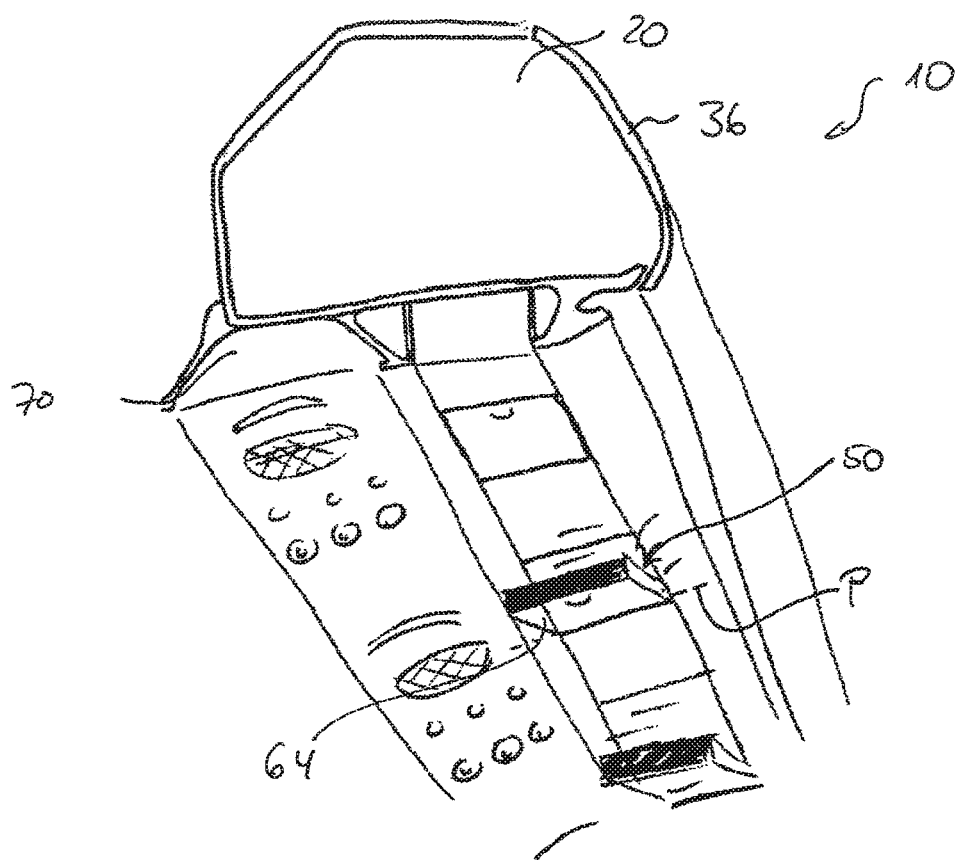
FIG. 7 is a further alternative aircraft luggage system suitable for installation in the aircraft region of FIG. 4.

In the aircraft luggage system 10 depicted in FIG. 7, the additional luggage compartment 50 is designed and arranged such that its shell 64 is pivotable relative to the luggage compartment 20 about a pivot axis P which extends substantially perpendicular to the longitudinal axis L of the aircraft area 100. The additional luggage compartment 50 is positioned beside a PSU channel 72 above rows of passenger seats. As a result, the additional luggage compartment 50 is easily accessible to passengers sitting on the passenger seats. Otherwise, the structure of the aircraft luggage system 10 according to FIG. 7 corresponds to the structure of the arrangement shown in FIG. 6.

Figure 8:
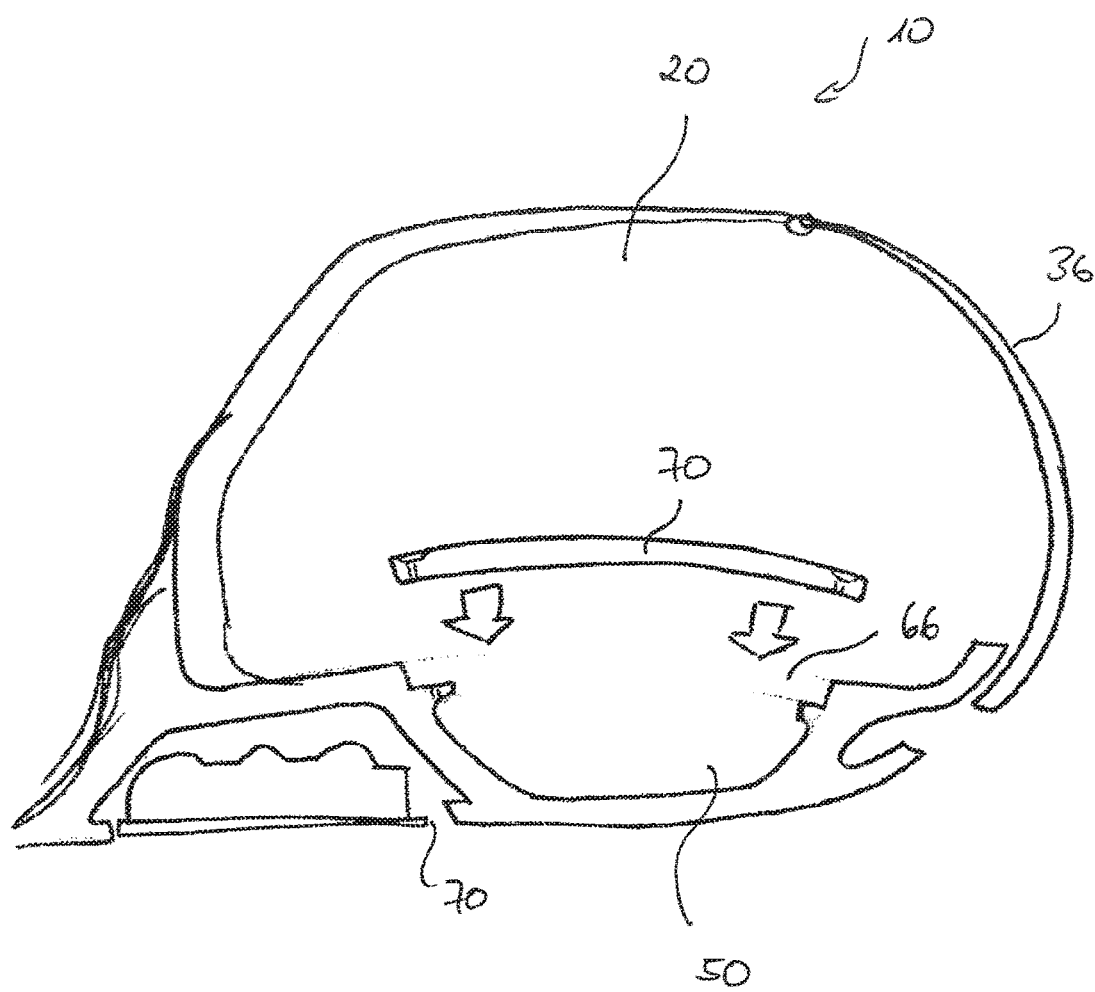
FIG. 8 is a further alternative aircraft luggage system suitable for installation in the aircraft region of FIG. 4.

FIG. 8 illustrates a further alternative aircraft luggage system 10 suitable for installation in the aircraft area 100 according to FIG. 4. In the luggage compartment arrangement according to FIG. 8, an access opening 66 of the additional luggage compartment 50 is formed in the lower side 28 of the luggage compartment 20. Hence, the additional luggage compartment 50 is accessible via an interior of the luggage compartment 20 and may be used to receive components to be mounted in the overhead region of the aircraft region 10 such as, for example, PSU components or system interfaces. The access opening 66 is covered by a detachable cover 70 which protects components mounted within the additional luggage compartment 50 from external influences, but still allows easy access to the components, if needed, for example for maintenance purposes. Otherwise, the structure of the aircraft luggage system 10 according to FIG. 9 corresponds to the structure of the arrangement shown in FIG. 6.

Figure 9:
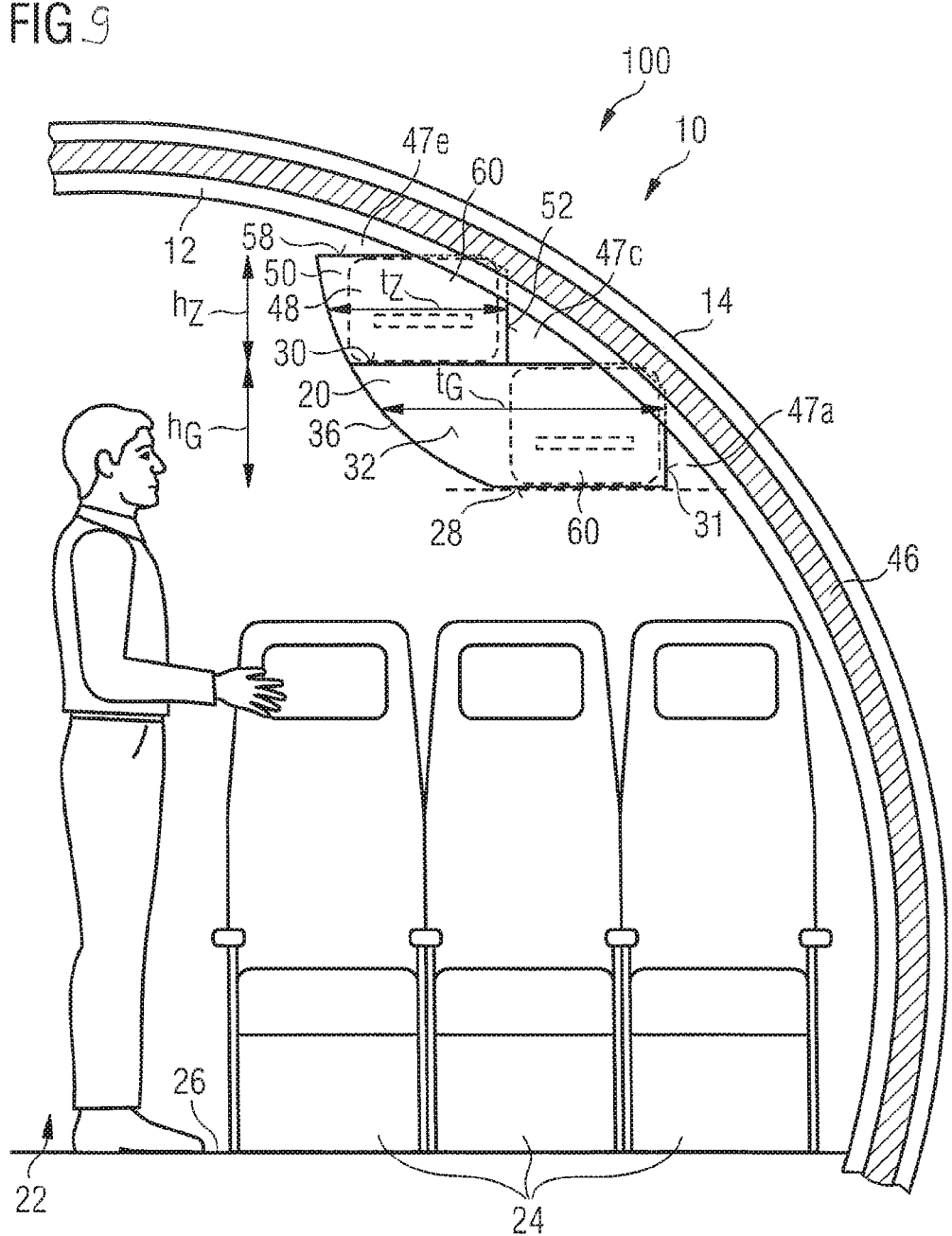
FIG. 9 is a cross-section of an aircraft region formed by a portion of an aircraft passenger cabin perpendicularly to a floor of the aircraft region, which is provided with another alternative aircraft luggage system.

In the aircraft region 100 shown in FIG. 9 there is fitted an aircraft luggage system 10 which differs from the arrangements illustrated in FIGS. 1 to 8 in that there is provided in addition to the luggage compartment 20 a first additional luggage compartment 48 which is arranged adjacent to the upper side 30 of the luggage compartment 20 and which is consequently arranged above the luggage compartment 20 in the direction of the ceiling region of the aircraft region 100. The first additional luggage compartment 48 is a luggage compartment which can be compared with the luggage compartment 20 in terms of the dimensions thereof, that is to say, the first additional luggage compartment 48 is, similarly to the luggage compartment 20, suitable for receiving standard pieces of luggage and has a lower side formed integral with the upper side 30 of the luggage compartment 20 and an upper side 58 which forms a ceiling-side delimitation of the aircraft luggage system 10.

With regard to its arrangement in relation to the ribs 12, 16, the first additional luggage compartment 48 has all the features which are described above in connection with the luggage compartment 20. That is to say, the first additional luggage compartment 48 is arranged between the first and the second rib 12, 16 in such a manner that a portion of a first side face of the first additional luggage compartment 48, which is directed towards the first rib 12, is arranged opposite a side face 38 of the first rib 12 in a parallel manner, which is directed towards the first additional luggage compartment 48, and that a portion of a second side face of the first additional luggage compartment 48, which is directed towards the second rib 16, is arranged opposite a side face 40 of the second rib 16 in a parallel manner, which is directed towards the first additional luggage compartment 48. Furthermore, a portion of the first side face of the first additional luggage compartment 48, which is directed towards the first rib 12, projects in the direction of the outer contour of the aircraft region 100 beyond the side face 38 of the first rib 12, which is directed towards the first additional luggage compartment 48. Similarly, a portion of the second side face of the first additional luggage compartment 48, which is directed towards the second rib 16, projects in the direction of the outer contour of the aircraft region 100 beyond the side face 40 of the second rib 16, which is directed towards the first additional luggage compartment 48.

The rear side 52 of the first additional luggage compartment 48 has, similarly to the rear side 31 of the luggage compartment 20, a shape which is appropriate for the outer contour of the aircraft region 100. In particular, the rear side 52 of the first additional luggage compartment 48 has a first portion which is adjacent to the lower side of the first additional luggage compartment 48 and which extends substantially perpendicularly relative to the lower side and the upper side 58 of the first additional luggage compartment 48. A second portion of the rear side 52 of the first additional luggage compartment 48 is inclined at an angle of approximately 145° relative to the first portion and is connected to the first portion by a transition portion which is inclined at an angle of approximately 155° relative to the first portion.

The portion of the first side face of the first additional luggage compartment 48, which is arranged opposite the side face 38 of the first rib 12, abuts the first primary insulation element 42 which partially surrounds the first rib 12. In a similar manner, the portion of the second side face of the first additional luggage compartment 48, which is arranged opposite the side face 40 of the second rib 16, abuts the second primary insulation element 44 which partially surrounds the second rib 16. Finally, the second portion of the rear side of the first additional luggage compartment 48 abuts the third primary insulation element 46. Conversely, the first portion and the transition portion of the rear side 52 of the first additional luggage compartment 48 and the upper side 58 of the first additional luggage compartment 48 are arranged at a distance from the third primary insulation element 46. A region 47c which is delimited by the upper side 30 of the luggage compartment 20, the rear side 52 of the first additional luggage compartment 48 and the outer contour of the aircraft region 100 is therefore available as installation space for components which are intended to be assembled in the aircraft region 100 similarly to a region 47e between the upper side 58 of the first additional luggage compartment 48 and the outer contour of the aircraft region 100.

The luggage compartment 20 and the first additional luggage compartment 48 have a common flap 36 which can be pivoted between a closed position and an open position. The curvature of the flap 36 is adapted to the arrangement and the shape of the luggage compartment 20 and the first additional luggage compartment 48 in such a manner that the luggage receiving capacity of the luggage compartment 20 and the first additional luggage compartment 48 are impaired as little as possible, but the impression of a generous provision of space still remains in the ceiling region of the aircraft region 100. Furthermore, the luggage compartment 20 and the first additional luggage compartment 48 are positioned in the aircraft region 100 in such a manner that the head room of passengers who are sitting in the passenger seats 24 is not excessively limited. The structure of the aircraft luggage system 10 according to FIG. 9 further corresponds to the structure of the arrangement according to FIGS. 1 to 8.

The significant design parameters of the aircraft region 100 and the aircraft luggage system 10 include the distance A between the first and second rib 12, 16, a maximum dimension lG of the luggage compartment 20 which is arranged between the first and second rib 12, 16 along the longitudinal axis L of the aircraft region 100, a maximum dimension hG of the luggage compartment 20 between the lower side 28 and the upper side 30 of the luggage compartment 20 and/or a maximum dimension tG of the luggage compartment 20 between the rear side 31 and the pivotable flap 36 of the luggage compartment 20. With regard to the first additional luggage compartment 48, a maximum dimension lz of the first additional luggage compartment 48 along the longitudinal axis L of the aircraft region 100, a maximum dimension hZ of the first additional luggage compartment 48 between the lower side and the upper side 58 of the first additional luggage compartment 48 and/or a maximum dimension tZ of the first additional luggage compartment 48 between the rear side 52 and the pivotable flap 36 may also be varied.

Those design parameters can be varied so that the luggage compartment 20 and the first additional luggage compartment 48 can each receive in a desired orientation a desired number of standard luggage pieces 60 which may be, for example, in the form of standard suitcases which are permitted on-board an aircraft as pieces of hand luggage. In the aircraft luggage system 10 illustrated in FIG. 9, for example, the rib distance A and the dimensions lG, hG, tG, lZ, hZ, tZ of the luggage compartment 20 and the first additional luggage compartment 48 are selected so that a standard luggage piece 60 has space in a state orientated along the longitudinal axis L of the aircraft region 100 and lying flat in the luggage compartment 20 and the first additional luggage compartment 48.

Figure 10:
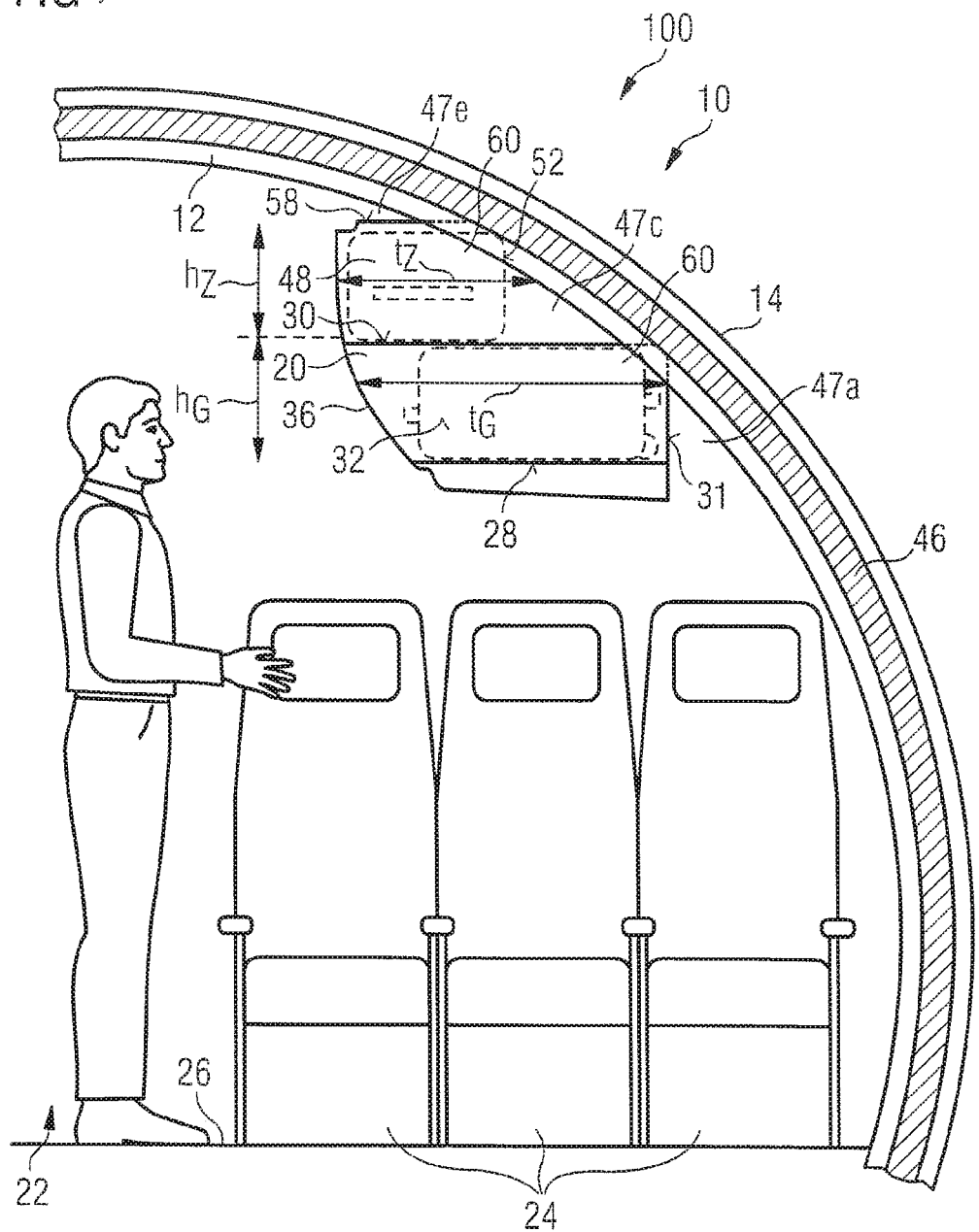
FIG. 10 is a cross-section of an aircraft region formed by a portion of an aircraft passenger cabin perpendicularly to a floor of the aircraft region, which is provided with another alternative aircraft luggage system.
Figure 11:
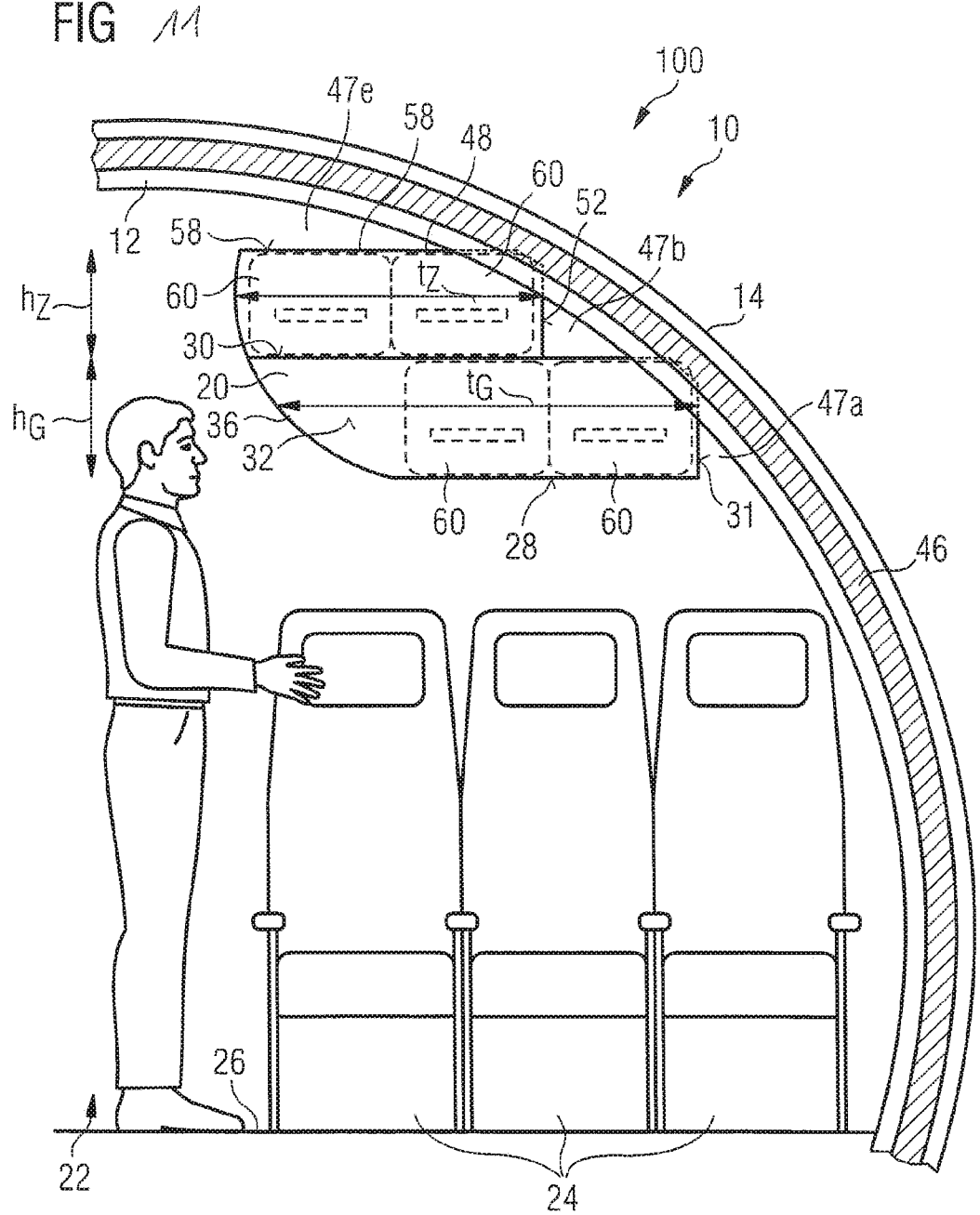
FIG. 11 is a cross-section of an aircraft region formed by a portion of an aircraft passenger cabin perpendicularly to a floor of the aircraft region, which is provided with another alternative aircraft luggage system.
Figure 12:
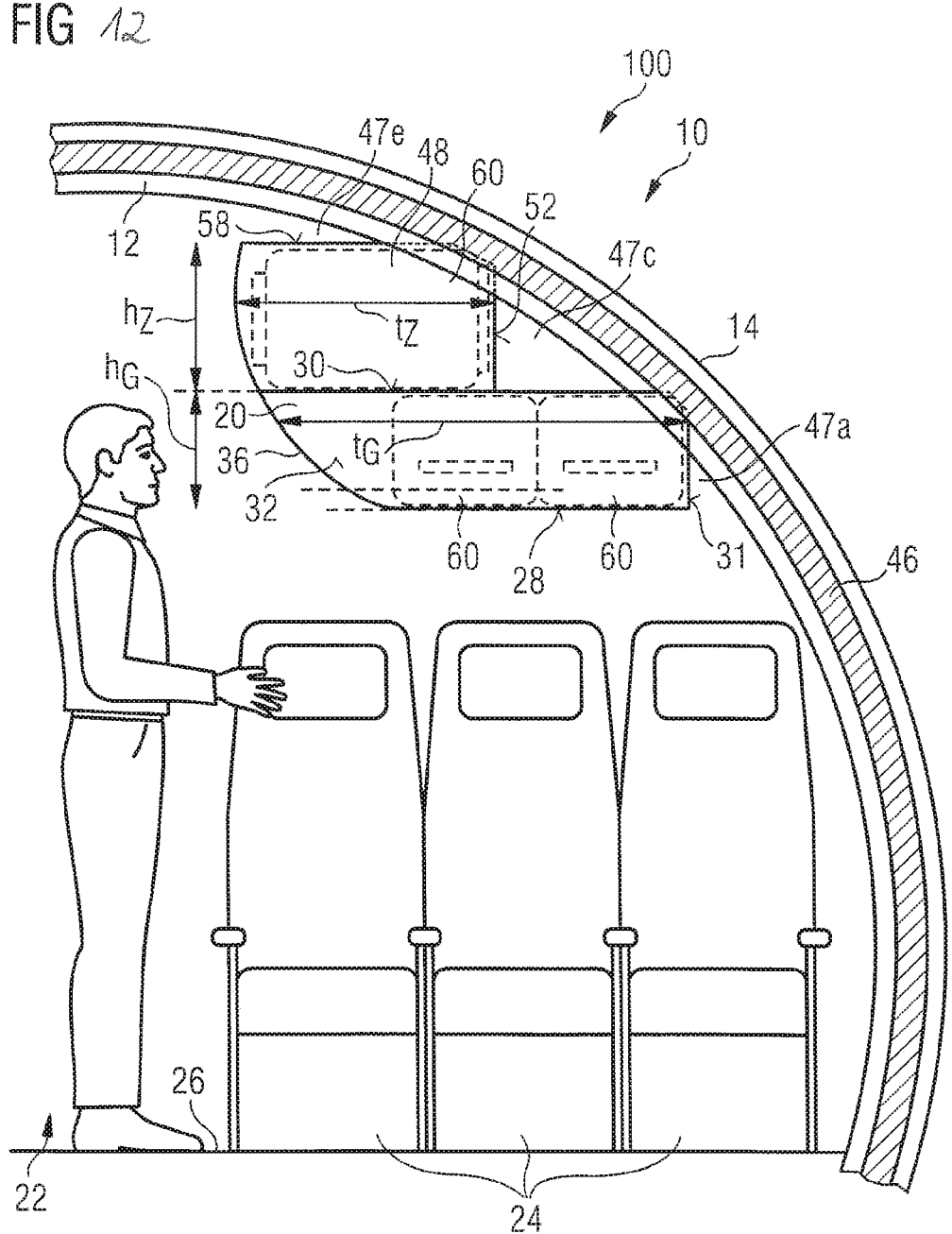
FIG. 12 is a cross-section of an aircraft region formed by a portion of an aircraft passenger cabin perpendicularly to a floor of the aircraft region, which is provided with another alternative aircraft luggage system.

In the aircraft luggage system 10 illustrated in FIG. 10, however, the rib distance A and the dimensions lG, hG, tG, lZ, hZ, tZ of the luggage compartment 20 and the first additional luggage compartment 48 are selected so that two standard luggage pieces 60 can be arranged in the luggage compartment 20 in a state orientated perpendicularly to the longitudinal axis L of the aircraft region 100 and lying flat in the luggage compartment 20. In the first additional luggage compartment 48, however, a standard luggage piece 60 has space in a state orientated along the longitudinal axis L of the aircraft region 100 and lying flat. Conversely, in the aircraft luggage system 10 illustrated in FIG. 11, the rib distance A and the dimensions lG, hG, tG, lZ, hZ, tZ of the luggage compartment 20 and the first additional luggage compartment 48 are selected so that two standard luggage pieces 60 have space one behind the other in the luggage compartment 20 and the first additional luggage compartment 48 in a state orientated along the longitudinal axis L of the aircraft region 100 and lying flat. Finally, in the aircraft luggage system 10 illustrated in FIG. 12, the rib distance A and the dimensions lG, hG, tG, lZ, hZ, tZ of the luggage compartment 20 and the first additional luggage compartment 48 are selected so that two standard luggage pieces 60 can be arranged in the luggage compartment 20 in a state orientated along the longitudinal axis L of the aircraft region 100 and lying flat one behind the other in the luggage compartment 20. In the first additional luggage compartment 48, however, there is space for two standard luggage pieces 60 in a state on end and orientated perpendicularly to the longitudinal axis L of the aircraft region 100. The structures of the aircraft luggage systems 10 according to FIGS. 10 to 12 further correspond to the structure of the arrangement according to FIG. 9.

Figure 13:
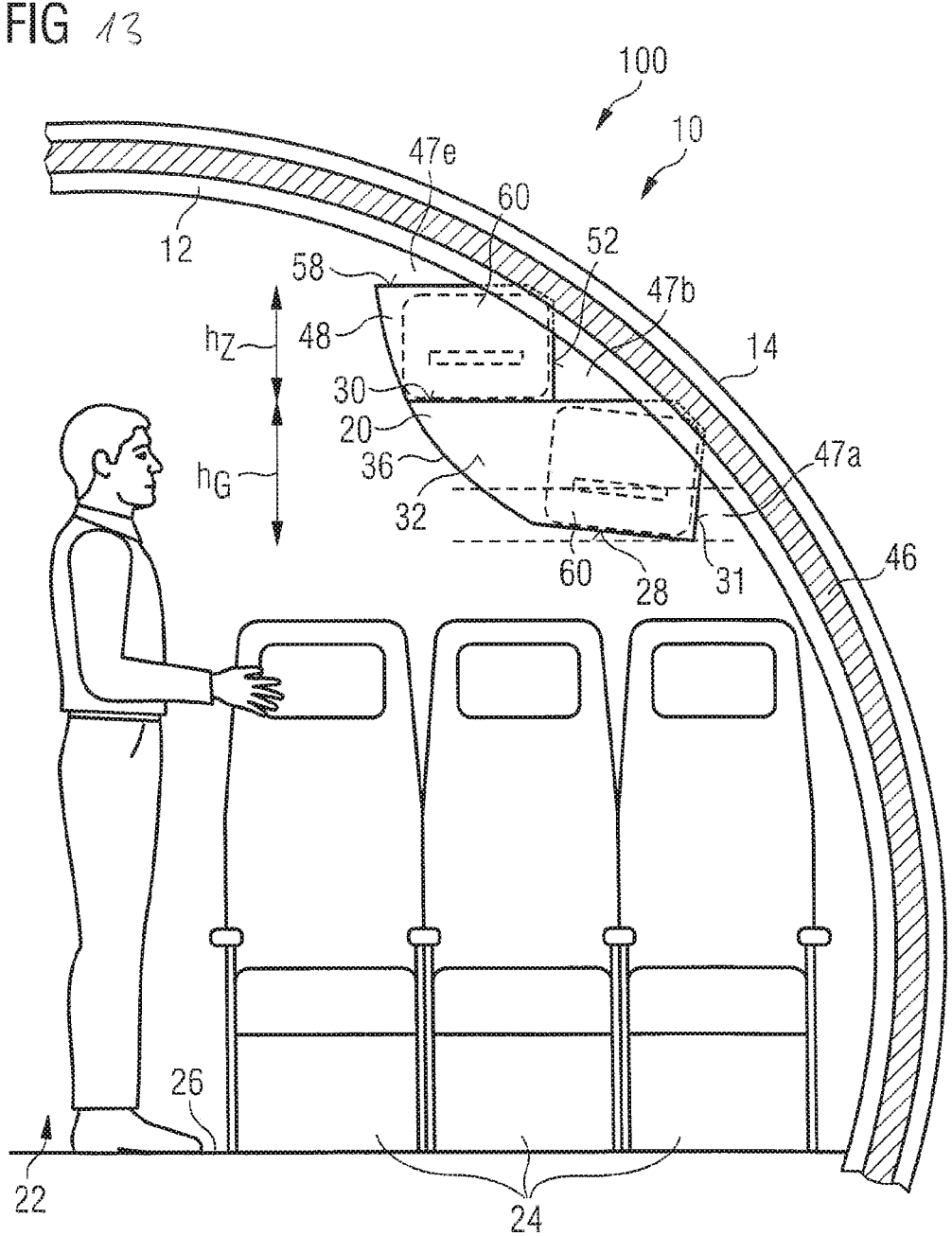
FIG. 13 is a cross-section of an aircraft region formed by a portion of an aircraft passenger cabin perpendicularly to a floor of the aircraft region, which is provided with another alternative aircraft luggage system.

In the aircraft region 100 shown in FIG. 13, there is fitted an aircraft luggage system 10 which differs from the arrangement illustrated in FIG. 9 in that the lower side 28 of the luggage compartment 20, similarly to in the system according to FIG. 4, is inclined at an angle of approximately 7° relative to the floor 26 of the aircraft region 100 in the direction of the outer contour of the aircraft region 100. However, the upper side 30 of the luggage compartment 20 is orientated parallel to the floor 26 of the aircraft region 100. The structure of the aircraft luggage system 10 according to FIG. 13 further corresponds to the structure of the arrangement according to FIG. 9.

Finally, in the aircraft region 100 shown in FIG. 14, there is fitted an aircraft luggage system 10 which differs from the arrangement illustrated in FIG. 10 in that the lower side 28 of the luggage compartment 20, similarly to in the system according to FIG. 4, is inclined at an angle of approximately 7° relative to the floor 26 of the aircraft region 100 in the direction of the outer contour of the aircraft region 100. However, the upper side 30 of the luggage compartment 20 is orientated parallel to the floor 26 of the aircraft region 100. Furthermore, the aircraft luggage system 10 is arranged in such a manner that the rear sides 31, 52 of the luggage compartment 20 and the additional luggage compartment 48, when viewed in the direction of the outer contour of the aircraft region 100, are arranged upstream of the ribs 12, 14 of the aircraft primary structure, that is to say, the luggage compartment 20 and the additional luggage compartment 48 therefore do not project into the rib shadow of the ribs 12, 14. The structure of the aircraft luggage system 10 according to FIG. 14 further corresponds to the structure of the arrangement according to FIG. 9.

Although specific features of the invention have been described here in connection with specific embodiments of the invention, those features may be freely combined with each other. In particular, features which are described here in connection with a specific embodiment of an aircraft luggage system 10 or an aircraft region 100 may be freely combined with each other.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft luggage system comprising:
   a luggage compartment comprising:
      an upper side directed towards a ceiling region of an aircraft region when the luggage compartment is assembled in the aircraft region,
      a lower side directed towards a floor region of the aircraft region when the luggage compartment is assembled in the aircraft region,
      a rear side comprising a wall directed towards an outer contour of the aircraft region when the luggage compartment is assembled in the aircraft region, and
      two side faces which connect the upper side to the lower side,
      wherein the lower side of the luggage compartment is rigidly connected to the side faces and the wall of the rear side of the luggage compartment,
   a flap movable between a closed position and an open position and configured to make an inner space of the luggage compartment accessible or to close the inner space of the luggage compartment, wherein the flap is located on a side of the luggage compartment opposite the rear side and is configured to pivot about a pivot axis to move between the closed position and the open position, the pivot axis extending along the upper side of the luggage compartment, and wherein the flap has a convex curvature when viewed from an interior of the aircraft region when looking towards the outer contour, and
   at least one additional luggage compartment arranged adjacent to at least one of the upper side and the lower side of the luggage compartment, wherein a maximum distance of the at least one additional luggage compartment from a rear side to a front side, is different than a maximum distance of the luggage compartment from the rear side to a front side of the luggage compartment.

2. The aircraft luggage system according to claim 1, wherein the additional luggage compartment comprises:
   an upper side directed towards the ceiling region of the aircraft region when the additional luggage compartment is assembled in the aircraft region,
   a lower side directed towards the floor region of the aircraft region when the additional luggage compartment is assembled in the aircraft region,
   a rear side comprising a wall directed towards the outer contour of the aircraft region when the additional luggage compartment is assembled in the aircraft region and
   two side faces which connect the upper side to the lower side,
   wherein the lower side of the additional luggage compartment is rigidly connected to the side faces and the wall of the rear side of the additional luggage compartment.

3. The aircraft luggage system according to claim 1, wherein the additional luggage compartment comprises a shell that is pivotable relative to the luggage compartment between a closed position and an open position about a pivot axis, wherein the pivot axis extends one of substantially parallel or substantially perpendicular to the longitudinal axis of the aircraft area.

4. The aircraft luggage system according to claim 1, wherein an access opening of the additional luggage compartment is covered by a mesh.

5. The aircraft luggage system according to claim 1, further comprising one of:
   the upper side of the additional luggage compartment being formed integral with the lower side of the luggage compartment, or
   the lower side of the additional luggage compartment is formed integral with the upper side of the luggage compartment.

6. The aircraft luggage system according to claim 1, wherein the side faces of the additional luggage compartment are formed integral with the side faces of the luggage compartment.

7. The aircraft luggage system according to claim 1, wherein the flap is further configured to make an inner space of the additional luggage compartment accessible or to close the inner space of the additional luggage compartment.

8. The aircraft luggage system according to claim 1, wherein the additional luggage compartment comprises a separately constructed flap which is movable between a closed position and an open position, wherein the flap of the luggage compartment and the flap of the additional luggage compartment are movable between the closed position and the open position thereof by being moved in opposite directions.

9. The aircraft luggage system according to claim 8, wherein the flap of the additional luggage compartment, which is movable between a closed position and an open position, when viewed from a position directed towards the aircraft luggage system when looking towards the flap of the additional luggage compartment, has a convex or a concave curvature.

10. The aircraft luggage system according to claim 1, wherein an access opening of the additional luggage compartment is formed in the lower side of the luggage compartment that faces a floor region of the aircraft area and is covered by a detachable cover.

11. The aircraft luggage system according to claim 1, wherein at least one of:
- a maximum dimension of the luggage compartment between the side faces of the luggage compartment,
- a maximum dimension of the luggage compartment between the lower side and the upper side of the luggage compartment, or
- a maximum dimension of the luggage compartment between the rear side and the movable flap of the luggage compartment, is selected in such a manner that a desired number of standard pieces of luggage can be received in a desired orientation in the luggage compartment.

12. The aircraft luggage system according to claim 1, wherein at least one of:
- a maximum dimension of the additional luggage compartment between side faces of the additional luggage compartment,
- a maximum dimension of the additional luggage compartment between a lower side and an upper side of the additional luggage compartment, or
- a maximum dimension of the additional luggage compartment between the rear side and a movable flap of the additional luggage compartment, is selected in such a manner that a desired number of standard pieces of luggage can be received in a desired orientation in the additional luggage compartment.

13. An aircraft region comprising:
an aircraft luggage system comprising:
  a luggage compartment comprising:
    an upper side directed towards a ceiling region of an aircraft region when the luggage compartment is assembled in the aircraft region,
    a lower side directed towards a floor region of the aircraft region when the luggage compartment is assembled in the aircraft region,
    a rear side comprising a wall directed towards an outer contour of the aircraft region when the luggage compartment is assembled in the aircraft region, and
    two side faces which connect the upper side to the lower side,
  wherein the lower side of the luggage compartment is rigidly connected to the side faces and the wall of the rear side of the luggage compartment,
  a flap movable between a closed position and an open position and configured to make an inner space of the luggage compartment accessible or to close the inner space of the luggage compartment, wherein the flap is located on a side of the luggage compartment opposite the rear side and is configured to pivot about a pivot axis to move between the closed position and the open position, the pivot axis extending along the upper side of the luggage compartment, and further wherein the flap has a convex curvature when viewed from an interior of the aircraft region when looking towards the outer contour, and
  at least one additional luggage compartment arranged adjacent to at least one of the upper side and the lower side of the luggage compartment, wherein a maximum distance of the at least one additional luggage compartment from a rear side to a front side, is different than a maximum distance of the luggage compartment from the rear side to a front side of the luggage compartment.

14. The aircraft region according to claim 13, wherein the luggage compartment is positioned in such a manner that at least one of the lower side and the upper side of the luggage compartment is inclined in the direction of an outer contour of the aircraft region at an angle of from 4 to 15° relative to a floor of the aircraft region.

15. The aircraft region according to claim 13, wherein the additional luggage compartment is positioned in such a manner that at least one of the lower side and the upper side of the additional luggage compartment is inclined in the direction of an outer contour of the aircraft region at an angle of from 4 to 15°.

16. The aircraft region according to claim 13, wherein the aircraft region further comprises:
- a first rib which forms a component of an aircraft primary structure and which extends in a curved manner along an outer contour of the aircraft region, and
- a second rib which is arranged at a distance from the first rib parallel to the first rib and which also forms a component of the aircraft primary structure and which extends in a curved manner along the outer contour of the aircraft region, wherein the luggage compartment is arranged between the first and second rib in such a manner that at least one of:
- a portion of a first side face of the luggage compartment, which is directed towards the first rib, is arranged opposite a side face of the first rib, which is directed towards the luggage compartment, or
- a portion of a second side face of the luggage compartment, which is directed towards the second rib is arranged opposite a side face of the second rib, which is directed towards the luggage compartment.

17. The aircraft region according to claim 16, wherein the additional luggage compartment is arranged between the first and second rib in such a manner that at least one of:
- a portion of a first side face of the additional luggage compartment, which is directed towards the first rib, is arranged opposite a side face of the first rib, which is directed towards the additional luggage compartment, or
- a portion of a second side face of the additional luggage compartment, which is directed towards the second rib, is arranged opposite a side face of the second rib, which is directed towards the additional luggage compartment.

18. The aircraft region according to claim 16, wherein at least one of:

the portion of the first side face of the luggage compartment, which is arranged opposite the side face of the first rib directed towards the luggage compartment, or the portion of the first side face of the additional luggage compartment, which is arranged opposite the side face of the first rib directed towards the additional luggage compartment, extends substantially parallel to the side face of the first rib directed towards the at least one of the luggage compartment and the additional luggage compartment.

19. The aircraft region according to claim 16, wherein at least one of:

the portion of the second side face of the luggage compartment, which is arranged opposite the side face of the second rib directed towards the luggage compartment, or the portion of the second side face of the additional luggage compartment, which is arranged opposite the side face of the second rib directed towards the additional luggage compartment, extends substantially parallel to the side face of the second rib directed towards the at least one of the luggage compartment and the additional luggage compartment.

20. The aircraft region according to claim 16, wherein at least one of:

a portion of the first side face of the luggage compartment, which is directed towards the first rib, projects in the direction of the outer contour of the aircraft region beyond the side face of the first rib, which is directed towards the luggage compartment, a portion of the second side face of the luggage compartment, which is directed towards the second rib, projects in the direction of the outer contour of the aircraft region beyond the side face of the second rib, which is directed towards the luggage compartment, a portion of the first side face of the additional luggage compartment, which is directed towards the first rib, projects in the direction of the outer contour of the aircraft region beyond the side face of the first rib, which is directed towards the additional luggage compartment, or a portion of the second side face of the additional luggage compartment, which is directed towards the second rib, projects in the direction of the outer contour of the aircraft region beyond the side face of the second rib, which is directed towards the additional luggage compartment.

21. An aircraft luggage system comprising:

a fixed bin type luggage compartment for being arranged in a position displaced in a direction of an outer contour of the aircraft and for being rigidly connected to a primary structure of the aircraft comprising:

an upper side directed towards a ceiling region of an aircraft region when the luggage compartment is assembled in the aircraft region, a lower side directed towards a floor region of the aircraft region when the luggage compartment is assembled in the aircraft region, a rear side comprising a wall directed towards the outer contour of the aircraft region when the luggage compartment is assembled in the aircraft region, and two side faces which connect the upper side to the lower side, wherein the lower side of the luggage compartment is rigidly connected to the side faces and the wall of the rear side of the luggage compartment, a flap movable between a closed position and an open position and configured to make an inner space of the luggage compartment accessible or to close the inner space of the luggage compartment, wherein the flap is located on a side of the luggage compartment opposite the rear side and is configured to pivot about a pivot axis to move between the closed position and the open position, the pivot axis extending along the upper side of the luggage compartment, and wherein the flap has a convex curvature when viewed from an interior of the aircraft region when looking towards the outer contour, and at least one additional luggage compartment arranged adjacent to at least one of the upper side and the lower side of the luggage compartment, wherein a maximum distance of the at least one additional luggage compartment from a rear side to a front side, is different than a maximum distance of the luggage compartment from the rear side to a front side of the luggage compartment.

* * * * *